(12) United States Patent
Borkar et al.

(10) Patent No.: US 7,769,098 B2
(45) Date of Patent: Aug. 3, 2010

(54) LOW COMPLEXITY PRECODING MATRIX SELECTION

(75) Inventors: Milind Anil Borkar, Atlanta, GA (US); Fernando Alberto Mujica, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 689 days.

(21) Appl. No.: 11/810,512

(22) Filed: Jun. 5, 2007

(65) Prior Publication Data

US 2008/0304464 A1  Dec. 11, 2008

(51) Int. Cl.
*H04B 7/02* (2006.01)
(52) U.S. Cl. ...................................... 375/267
(58) Field of Classification Search ........... 375/260, 375/267; 455/562.1
See application file for complete search history.

(56) References Cited

U.S. PATENT DOCUMENTS

| | | | |
|---|---|---|---|
| 2006/0111148 A1 * | 5/2006 | Mukkavilli et al. | 455/562.1 |
| 2006/0268623 A1 | 11/2006 | Chae et al. | |
| 2007/0191066 A1 * | 8/2007 | Khojastepour et al. | 455/562.1 |
| 2007/0249296 A1 * | 10/2007 | Howard et al. | 455/101 |

* cited by examiner

*Primary Examiner*—Don N Vo
(74) *Attorney, Agent, or Firm*—Steven A. Shaw; W. James Brady; Frederick J. Telecky, Jr.

(57) ABSTRACT

A method of determining indices for matrix codewords in a matrix codeword codebook. The matrix codewords are adapted for communicating information between a transmitter and a receiver. The method includes retrieving from temporary storage, an eigenmode representation for a communications channel, where the eigenmode representation is based upon on a received signal precoded by a first matrix codeword. The method also includes performing a test on multiple vector codewords to identify a first vector codeword among the multiple vector codewords, where the test includes determining a relationship between the first vector codeword and the representation of an eigenmode. The first vector codeword is associated with a first vector codeword index that identifies the first vector codeword. The method also includes generating a matrix codeword index associated with a second matrix codeword in the matrix codeword codebook. The matrix codeword index is based upon the first vector codeword index, and the order of the first vector codeword is different from the order of the second matrix codeword.

20 Claims, 8 Drawing Sheets

LOW COMPLEXITY PRECODING MATRIX SELECTION

BACKGROUND INFORMATION

Spectral efficiency or throughput of a communications network can be improved by employing a multiple-input-multiple-output (MIMO) system in which a transmitter uses multiple antennas and the receiver uses multiple antennas. A MIMO system in which there are two antennas at the transmitter and two antennas at the receiver can practically achieve twice the throughput, i.e., the amount of information that can be transferred in a period of time, of a single-input-single-output (SISO) system. The throughput increases linearly with every additional antenna. To increase throughput, MIMO systems can use a variety of techniques including spatial multiplexing (SM), space-time coding (STC), or beamforming (also known as adaptive antenna). In spatial multiplexing, a signal (coded and modulated data stream) is transmitted across different spatial domains.

A MIMO system can use adaptive antenna technology to improve the performance of a transceiver such as that of a base station or wireless router, or the device used by a subscriber, e.g., cell phone, or WiFi card, which is coupled to multiple antennas. The transmitter of a transceiver using adaptive antenna technology can selectively direct the energy of the transmitter in the direction of a particular receiver (e.g., the receiver of a subscriber or the receiver of a base station's transceiver). Similarly, the receiver can give preference to signals arriving from a particular transmitting device while rejecting or attenuating those that are coming from other directions. The end effect of beam forming is that the adaptive antenna system in a transceiver either radiates signal energy primarily in a certain direction(s) and minimally radiates signal energy in other directions, or alternatively passes signal energy received from a certain direction(s) to the demodulator and decoder in the receiving chain while attenuating the energy of other signal(s) received from other directions. Beamforming allows communication to occur in situations that would otherwise prevent communication due to low SNR.

Beamforming in some MIMO implementations can allow a base station's transceiver to provide space division multiple access (SDMA) to multiple subscriber devices all of which are using the same channel simultaneously.

The higher performance of MIMO systems that use beamforming comes at a cost of relatively increased complexity or resource consumption (e.g., power, computation) at transceivers. To perform beamforming in a particular direction and provide multiple data streams to multiple receivers, a transceiver generates codeword matrices that are used to specify the antenna or antennas that are being activated. The codewords selected depend on the quality and nature of the channel between the transceiver and receiver. However, as described below, the transceiver often depends on the receiver to provide it with indications as to channel quality and codeword to use.

Many, if not most, MIMO systems operate in Frequency Division Duplex (FDD) mode. FDD refers to the use of separate frequencies for the forward link and reverse link. In FDD mode, the transmitter itself cannot determine the channel estimate for the forward link to the receiver because the receiver does not transmit back to the transmitter on the same frequencies that the transmitter uses for the forward link. The current Institute of Electrical and Electronics Engineers (IEEE) 802.16e system determines a beamforming matrix using 3-bit or 6-bit quantized feedback information, where the 3-bit or 6-bit quantized feedback information is an index of a codeword in a codebook that contains multiple codewords.

The codeword selected by a receiver allows a transmitter to better take advantage of the channel's dominant modes. Depending on the criterion used to select a codeword matrix, a channel's dominant modes are the combination of frequencies and antennas that would deliver the most information to the receiver given the quality of the channel link—between the base station transceiver and the receiver—that may be suffering from varying degrees of fading, errors, etc. . . .

A MIMO system in which a receiver communicates back to a transceiver an indication of a codeword matrix is referred to as a closed loop MIMO system. Performance of a beamforming MIMO system is substantially enhanced by having a receiver communicate to a base station's transceiver feedback information regarding the beamforming matrix (or codeword) that the receiver computes and quantizes in response to perceived channel conditions.

Since the feedback information uses bandwidth that could ostensibly be used by data, a conventional approach to reduce the overhead associated with this feedback is to provide matrix codebook(s) at each of the transmitter and the receiver, where each of the codebook(s) includes a plurality, or set, of potential beamforming matrices that may be used depending on the channel conditions perceived at the receiver. When the receiver has identified the appropriate matrix codebook(s), the receiver will typically feed back only an index (instead of the actual matrix entries) that points to the appropriate codeword in the codebook(s) stored at the transmitter.

For a different combination of transmit antennas, $N_t$, and receiver antennas, $N_s$, a different matrix codebook is required. The order or size of the codeword matrices in a codebook is based on the number of transmitter antennas and the number of data streams: $N_t$ by $N_s$ matrix.

FIG. 1 is a block diagram of a conventional closed-loop MIMO system with a transmitter and receiver that provides a codeword indication to the transmitter. Referring to FIG. 1, system 100 includes transmitter 102, which includes a coder and modulator 103, beamformer 104, transmitter beamforming logic 109, and multiple transmit antennas 106 to 108. Receiver 122 includes demodulator and decoder 123, channel and symbol estimator 124, receiver beamforming logic 129, and multiple receiver antennas 126 to 128.

At transmitter 102, coder and modulator 103 encodes transmission data in a predetermined coding scheme and modulates the coded data in a predetermined modulation scheme. Transmitter beamforming logic 109 generates a beamforming matrix based upon a feedback index received from receiver beamforming logic 129. Beamformer 104 multiplies the data and system information vector (that is, complex symbols of both data and signals such as training symbols, pilot signals, etc. . . . ) received from coder and modulator 103 by the generated beamforming matrix and transmits the resulting signals through antennas 106 to 108.

At receiver 122, the transmitted signals which have been transformed by the channel and corrupted by noise are received at antennas 126 to 128 and are provided to channel and symbol estimator 124. Channel and symbol estimator 124 calculates a channel coefficient matrix, H, by estimating the effect of the channel on pilot signals which are predefined signals whose characteristics are known to the receiver. By 'comparing' the received pilot signals to a stored alias, the receiver is able to determine H. Typically, H represents how the channel has 'undesirably' affected the transmitted signal.

Channel and symbol estimator 124 produces received symbols estimates by using knowledge of H to 'reverse' the effect of the channel on the transmitted symbols. Demodulator and decoder 123 demodulate and decode the received symbol estimates, thereby recovering the original information data. Meanwhile, receiver beamforming logic 129 selects a beamforming matrix or codeword by computing a cost function, e.g. Eq. 1 below.

Determining the proper codeword—for which an indication is to be sent to a transceiver—is computationally intensive because it involves going through a codebook and determining the degree to which codeword matrices in the codebook satisfy a certain objective such as maximizing received signal-to-noise Ratio (SNR) or minimizing the mean square error (MSE) of a received signal. To select an optimal beamforming vector or matrix, a receiver needs to compute the following equations and send back the resulting codeword, $V_i$, that optimizes the selected criterion, to the transmitter on a feedback channel.

$$SNR_{MMSE}(V_i) = \min_{k=1\ldots S} \frac{E_t}{SN_0 \left[ V_i^H H^H H V_i + \left( \frac{SN_0}{E_t} \right) I_S \right]^{-1}_{k,k}} - 1 \quad \text{Eq. 1}$$

$$\hat{V} = \underset{V_i}{\operatorname{argmax}}(SNR_{MMSE}(V_i))$$

In Eq. 1, codeword $V_i$ denotes a beamforming vector or matrix selected from a known codebook, $E_t$ denotes total transmitted energy, S denotes the number data streams, $N_o$ denotes noise power $I_s$ denotes an identity matrix, H denotes a channel coefficient matrix between the transmit antennas and the receive antennas.

TABLE 1

| Index | Column 1 | Column 2 |
|---|---|---|
| 000 or $V_1$ | 0 | 0 |
| | 1 | 0 |
| | 0 | 1 |
| 001 or $V_2$ | −0.7201 + j0.3126 | 0.2483 + j0.2684 |
| | −0.2326 | 0.1898 + j0.5419 |
| | 0.1898 − j0.5419 | 0.7325 |
| 010 or $V_3$ | −0.4537 | 0.0752 − j0.2483 |
| | 0.0752 + j0.2483 | 0.9537 |
| | −0.6283 + j0.5763 | −0.0659 − j0.1371 |
| 011 or $V_4$ | −0.0063 − j0.6527 | 0.4621 + j0.3321 |
| | 0.1477 | 0.4394 − j0.5991 |
| | 0.4394 + j0.5991 | 0.3522 |
| 100 or $V_5$ | 0.7171 − j0.3202 | −0.2533 − j0.2626 |
| | −0.2337 | 0.1951 + j0.5390 |
| | 0.1951 − j0.5390 | 0.7337 |
| 101 or $V_6$ | 0.4819 + j0.4517 | 0.2963 + j0.4801 |
| | 0.1354 | −0.7127 − j0.1933 |
| | −0.7127 + j0.1933 | 0.3692 |
| 110 or $V_7$ | 0.0686 + j0.1386 | 0.6200 − j0.5845 |
| | 0.9522 | 0.0770 + j0.2521 |
| | 0.0770 − j0.2521 | −0.4522 |
| 111 or $V_8$ | −0.0054 + j0.6540 | −0.4566 − j0.3374 |
| | 0.1446 | 0.4363 − j0.6009 |
| | 0.4363 + j0.6009 | 0.3554 |

Table 1 shows the codebook for the case of three transmit antennas, two transmission streams and 3-bit feedback information. In this case, the two columns represent how the two data streams are split over the three transmit antennas before they are combined together and transmitted. The receiver computes a cost function, e.g., Eq. 1, sequentially over the beamforming matrices $V_1$ to $V_8$ in the above codebook and selects a beamforming matrix that maximizes that cost function. The receiver then feeds back the index of the selected beamforming matrix in three bits. The transmitter carries out beamforming by multiplying a transmission vector by the beamforming matrix indicated by the index. This beamforming enhances link performance. The current IEEE 802.16e system adopts 19 different codebooks for two to four transmit antennas, one to four streams, and 3-bit or 6-bit feedback information.

Performing repeated matrix computations for complex values, in addition to being computationally intensive, often involves consuming battery power that is usually a scarce resource on mobile devices. Repeated matrix computations can also add an element of delay in returning an indication of a codeword to the transceiver. Furthermore, inefficient repeated matrix comparisons result in power (often battery power) being unnecessarily wasted and/or additional unnecessary delay in identifying a codeword that matches the dominant channel modes.

Prior art solutions suffer from many shortcomings, some of which are identified herein. As described above, current devices and systems which provide feedback regarding a codeword selected at a receiver employ solutions that suffer from one or more of the following defects: are computationally intensive, consume relatively more power, require a relatively large amount of memory, and are a possible source of delay in returning feedback to a transceiver in a timely manner. Given the shortcomings of the prior art, it is desirable to provide solutions that overcome the deficiencies of the prior art.

SUMMARY

In an embodiment, a method of determining indices for matrix codewords in a matrix codeword codebook—where the matrix codewords are adapted for communicating information between a transmitter and a receiver—, includes retrieving from temporary storage a representation of an eigenmode for a communications channel. The representation of the eigenmode is based upon on a received signal precoded by a first matrix codeword. The method also includes performing a test on multiple vector codewords to identify a first vector codeword among the multiple vector codewords, where the test includes determining a relationship between the first vector codeword and the representation of an eigenmode. The first vector codeword is associated with a first vector codeword index that identifies the first vector codeword. The method also includes generating a matrix codeword index associated with a second matrix codeword in the matrix codeword codebook. The matrix codeword index is based upon the first vector codeword index, and the order of the first vector codeword is different from the order of the second matrix codeword.

BRIEF DESCRIPTION OF THE DRAWINGS

The invention is illustrated by way of example, and not limitation, in the figures of the accompanying drawings in which like references denote similar elements, and in which.

DETAILED DESCRIPTION

Figure 1:
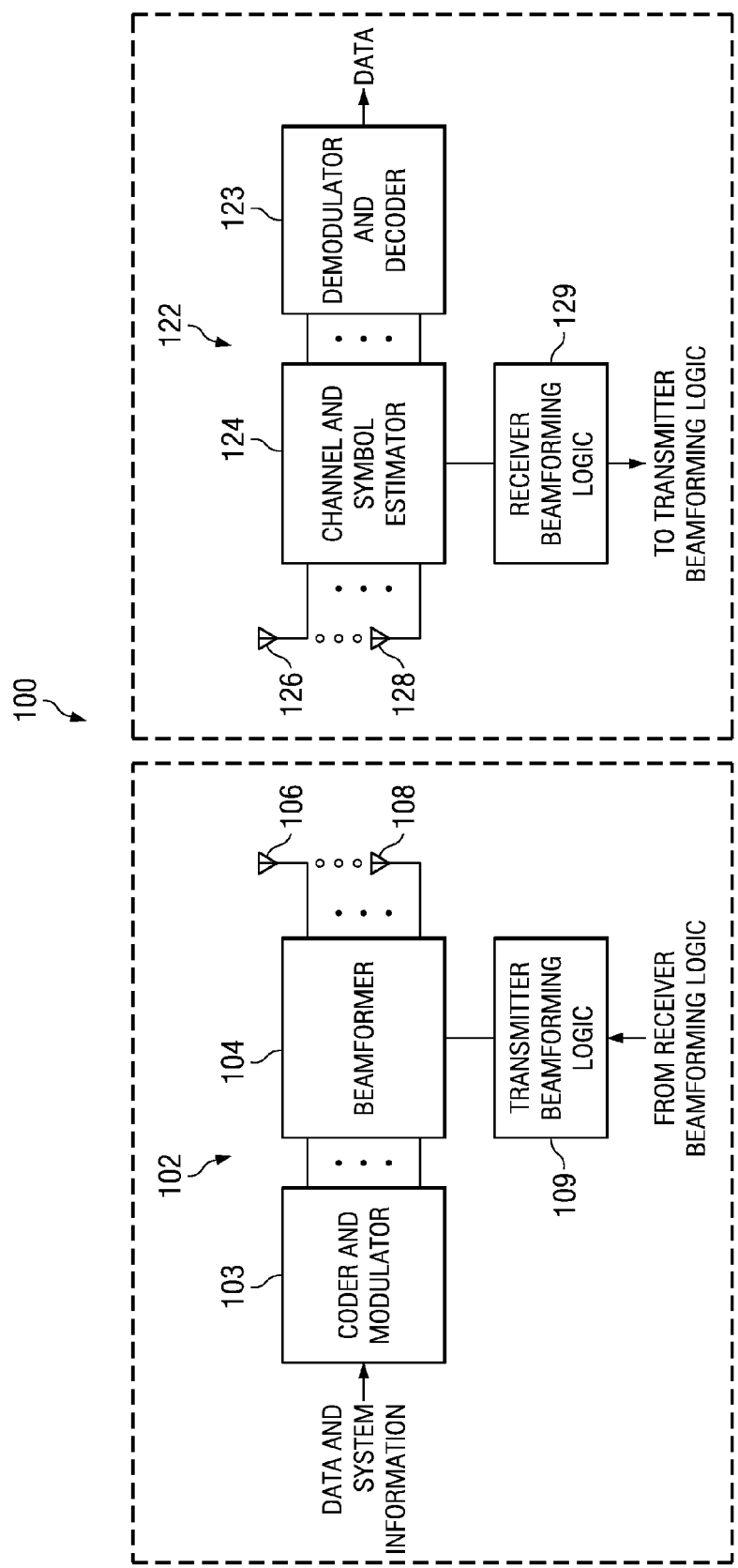
FIG. 1 is a block diagram of a conventional closed-loop MIMO system with a transmitter and receiver that provides a codeword indication to the transmitter.

According to the invention, methods and apparatus for low complexity codeword selection are described. In the following description, for purposes of explanation, numerous specific details are set forth in order to provide a thorough understanding of embodiments according to the invention. It will be evident, however, to one of ordinary skill in the art that the invention may be practiced in a variety of contexts including closed loop multiple-input-multiple-output (MIMO) systems without these specific details. In other instances, well-known operations, steps, functions and elements are not shown in order to avoid obscuring the description.

Parts of the description will be presented using terminology commonly employed by those skilled in the art to convey the substance of their work to others skilled in the art, such as fast Fourier transform (FFT), inverse fast Fourier transform (IFFT), discrete Fourier transform (DFT), channel estimate, pilot signals, codebook, codeword, strong and weak eigenmodes, Householder transform, signal-to-noise ratio (SNR), minimum mean square error (MMSE) and so forth. Various operations will be described as multiple discrete steps performed in turn in a manner that is most helpful in understanding the embodiments according to the invention. However, the order of description should not be construed as to imply that these operations are necessarily performed in the order that they are presented, or even order dependent. Repeated usage of the phrases "in an embodiment," "an alternative embodiment," or an "alternate embodiment" does not necessarily refer to the same embodiment, although it may. Additionally, one of ordinary skill in the art would appreciate that a graphical description of an apparatus in the figures of the drawings interchangeably represents either an apparatus or a method.

For ease of reference, the following notation or labels will be used in the remainder of the description to refer to certain terms or phrases:

| | |
|---|---|
| M × N | Matrix dimensions, M rows and N columns |
| $x$ | Scalar |
| x | Vector (row or column) |
| X | Matrix |
| 1/x | Element-wise division of the elements of x, results in a vector the same size of x |
| diag(x) | Matrix with elements of x on main diagonal |
| diag(X) | Vector with elements of main diagonal of X |
| $I_K$ | K × K identity matrix |
| $e_i$ | $i^{th}$ column of an identity matrix |
| $[.]_{m,n}$ | $(m,n)^{th}$ element of a matrix. |
| $(.)^*$ | Complex conjugate |
| $(.)^T$ | Transpose |
| $(.)^H$ | Hermitian transpose |
| $\|.\|_F$ | Frobenius norm |
| E{.} | Expectation operator |
| $N_t$ | Number of transmit antennas |
| $N_r$ | Number of receive antennas |
| S | Number of data streams |
| L | Number of feedback bits for codeword index |
| $CB(N_t, S, L)_i$ | $i^{th}$ entry in the codebook for $N_t$ transmitters, S streams and L bits of feedback for the codebook index |
| $E_t$ | Total transmitted energy. |
| $N_0$ | Receiver noise variance. |
| H | Channel realization. |
| $\mathcal{H}$ | Householder transformation. |
| $v_i$ | $i^{th}$ entry in the current vector codebook. |
| $V_i$ | $i^{th}$ entry in the current matrix codebook. |
| V | Right singular matrix obtained from a singular value decomposition |
| $V_s$ | Strong eigenmodes |
| $V_w$ | Weak eigenmodes |
| Σ | Diagonal matrix containing singular values. |
| $\sigma_i$ | $i^{th}$ singular value |
| MIMO | Multiple Input Multiple Output |
| ML | Maximum Likelihood |
| MMSE | Minimum Mean Squared Error |
| QRD | QR Decomposition |
| SVD | Singular Value Decomposition |
| FEC | Forward Error Correction |
| BER | Bit Error Rate |
| FER | Frame Error Rate |
| SNR | Signal to Noise Ratio |

Orthogonal Frequency Division Multiplexing (OFDM) or Orthogonal Frequency Division Multiple Access (OFDMA) employing orthogonal frequency domain modulation is a popular modulation technique for wireless communications.

OFDM has been adopted in standards for technologies such as wireless networks (802.11a/g), digital television broadcasting (DVB-T/S/H and ISDB-T), and broadband wireless local loops (802.16e/WiMax). An OFDM wireless transmitter broadcasts information consisting of symbols to an OFDM receiver employing a wireless communication channel between the transmitter and the receiver. The characteristics of this communication channel typically vary over time due to changes in the transmission path. Given that the performance of the entire communication system depends on the receiver establishing a reliable representation of transmitted symbols, the receiver determines a channel estimate of the transmission channel before decoding. Beamforming in conjunction with the channel estimate allows transmitted symbols to be more reliably represented and decoded at the receiver.

In OFDM communication systems, channel equalization is performed in the frequency domain. Each block of data is preceded by a cyclic prefix, ensuring that the sub-carriers generated by a discrete Fourier transform (DFT) of a properly chosen block of data are orthogonal. This allows a linear time-invariant channel to be equalized in the frequency domain. Practical OFDM communication systems estimate the channel (i.e., determine the channel's frequency response) using values provided from a set of pilot signals or sub-carriers. The receiver generates samples of the channel's frequency response by dividing the received pilot signal values by known modulated training data. The channel estimates at the data sub-carriers are estimated from these samples.

A channel estimate matrix H describes the complex gains between each transmitter antenna and each receiver antenna. For example, in the m by n matrix H below, $h_{11}$ indicates the complex gain between antenna 1 of the transmitter and antenna 1 of the receiver, while $h_{12}$ indicates the complex gain between antenna 1 of the receiver and antenna 2 of the transmitter and so forth for the remaining entries in H. One of ordinary skill in the art would appreciate that H can have an order of varying dimensions and depends on, among other things, the number of receive and transmit antennas available and that are activated at any particular moment.

$$H = \begin{bmatrix} h_{11} & h_{12} & \cdots & h_{1n} \\ h_{21} & h_{22} & & \vdots \\ \vdots & & & \vdots \\ h_{m1} & h_{m2} & \cdots & h_{mn} \end{bmatrix}$$

Figure 2:
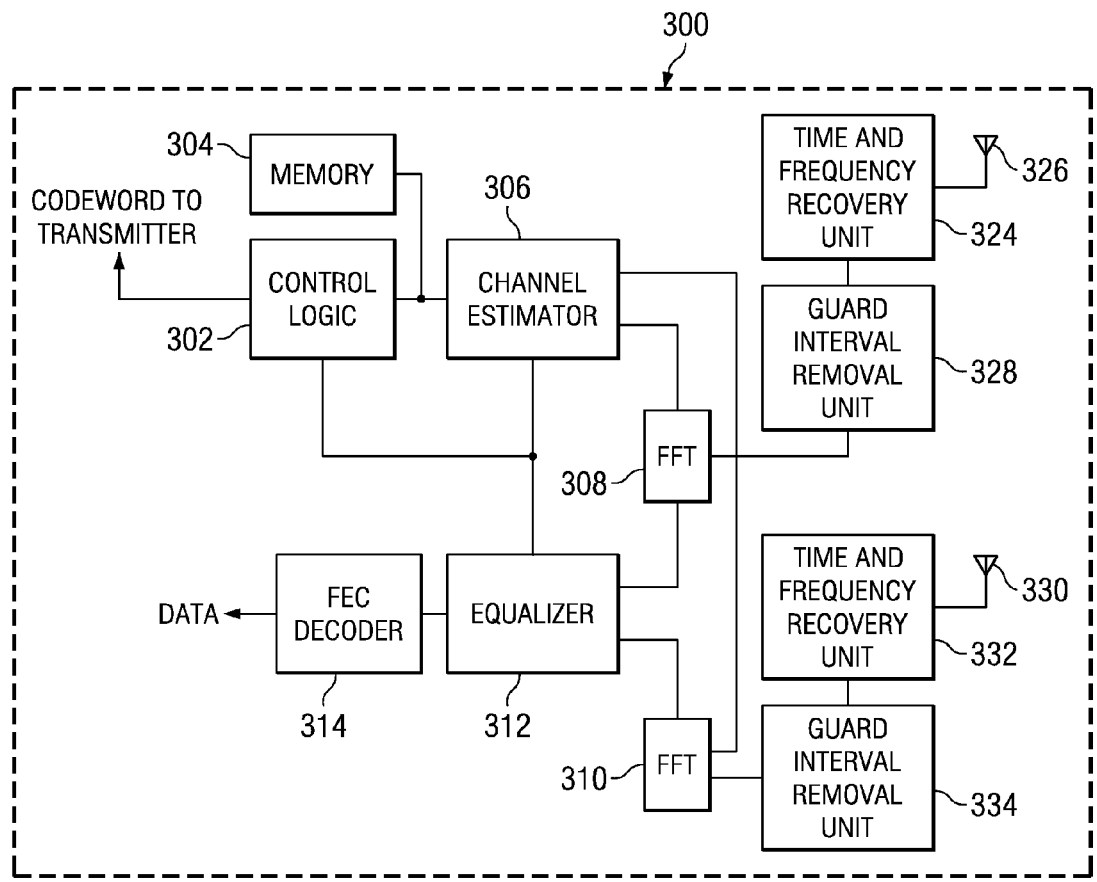
FIG. 2 illustrates a receiver that determines codewords for enhancing communication in accordance with an embodiment of the invention.

FIG. 2 illustrates a receiver that determines codewords for enhancing communication in accordance with an embodiment of the invention. Receiver 300 includes antennas 326, 330 that receive a signal from a transmitter (not shown) that transmits the signal via multiple antennas (not shown). In an alternative embodiment, a receiver may have more or fewer antennas than those of receiver 300. Antennas 326, 330 are coupled to timing and frequency recovery units (TFRU) 324, 332, respectively. Timing and frequency recovery units 324, 332 detect packets, perform time synchronization between receiver 300 and a transmitter (not shown), and correct coarse frequency offset errors between the oscillator (not shown) of receiver 300 and the oscillator (not shown) of the transmitter (not shown). In an embodiment, control logic 302, which can be a microprocessor or microcontroller or digital signal processing chip(s), directs the operation of units 304 through 334, including TFRU 324, 332. One of ordinary skill in the art would appreciate that the various embodiments of the invention can be implemented in software, firmware, or an application specific integrated circuit (ASIC) or any suitable combination of these or other components.

Guard interval removal units 328, 334 remove the guard interval that is added to the beginning of symbol in order to avoid inter-symbol interference (ISI) that could otherwise occur when two adjacent symbols overlap due to delay in the arrival of the first-transmitted symbol in relation to the arrival of a second-transmitted symbol that follows it.

FFT units 308, 310 coupled to the guard interval removal units 328, 334, respectively, performs fast Fourier transforms of blocks of data that are derived from the sampled analog signal received by antennas 326, 330. The output of FFT units 308, 310 is provided to channel estimator 306 and equalizer 312.

Channel estimator 306 uses the output of FFT units 308, 310 that is based on received pilot signals and non-channel transformed and noise-free aliases of the pilots signals stored in memory 304 to produce channel estimates such as matrix H described above. Channel estimator 306 provides channel estimates H to control logic 302 and equalizer 312 which also receives the output of FFT units 308, 310.

Based upon a channel estimate, control logic 302 selects a codeword that satisfies a certain criterion such as, but not limited to, maximizing signal-to-noise ratio or minimizing inter-symbol interference. Control logic 302 sends via a feedback channel an indication of the selected codeword to a transmitter with which receiver 300 is communicating. Control logic 302 stores in memory 304 an indication of the codeword that was selected so that equalizer 312 can use it to process a subsequent frame that is received from the transmitter. The subsequent frame is one that the transmitter generates using the selected codeword for which it received from receiver 300 an indication of the selected codeword.

Control logic 302 then retrieves from memory a previously stored codeword for which it sent an indication to the transmitter via the feedback channel. Equalizer 312 processes the data blocks presently received from FFT units 308, 310 using the previously stored codeword to produce estimates of the data symbols that benefit from the diversity and gain provided by having multiple antennas 326, 330 at receiver 300. By producing a single estimate of each data block even though it may have been received partially at antenna 326 and partially at antenna 330, equalizer 312 acts as a parallel-to-serial converter.

The transmitter may perform binary phase shift keying (BPSK), quaternary PSK (QPSK), 16-quadrature amplitude modulation (QAM), or 64-QAM. The modulation scheme is determined according to feedback as to signal-to-noise ratio (SNR) at the receiver. For example, if the modulation were 16-QAM and the SNR is decreasing, the modulation would be changed to QPSK to lower the error rate. This adaptation of modulation and coding to channel conditions is referred to as adaptive modulation and coding (AMC). QAMM 316 then unpacks the groups of bits it receives in order to undo the transmitter's grouping of bits into groups of 1, 2, 4, or 6 bits.

An OFDM system may have several hundred sub-carriers of which a band(s) (or subset) may be assigned to a single receiver for a period of time. The data being sent to the receiver is distributed at the transmitter across the sub-carriers associated with the band(s) assigned to the user. The sub-carriers associated with a band need not be contiguous and sometimes are not contiguous. By having non-contiguous sub-carriers, the probability that interference affecting the data on one sub-carrier also affecting data on another subcarrier is decreased. Embodiments of the invention apply to operation with contiguous sub-carriers and to operation with non-contiguous sub-carriers.

In an embodiment, forward error correction (FEC) decoder 314 undoes the interleaving that was performed at the transmitter by taking the bits in a group and distributing and reordering them so they are once again in the order they were presented to the transmitter's interleaver. In an embodiment, FEC decoder 314 also adds the redundant bits that were the result of the transmitter's convolutional coding and that that were removed by the transmitters puncturer in order to improve the data rate. In an embodiment, FEC decoder 314 decodes the depunctured bits and provides a logical data stream for processing by higher layers of the receive stack. One of ordinary skill in the art would appreciate that, in an alternative embodiment, one or more of the functions performed by FEC decoder 314 may be missing. One of ordinary skill in the art would also appreciate that the invention is not limited to any particular technique or must include any technique for providing one or more of the following: burst noise immunity, coding gain, or fading immunity.

Having described in general terms the operation of a receiver that selects a codeword for processing received signals and that provides an indication of the selected codeword to a transmitter, some background information on codebooks and codewords and their generation is provided below followed by a more detailed description of the selection of codewords.

Codebooks can be classified into two main types: a) vector codebooks with vector codewords for use when there are multiple antennas at the transmitter and a single antenna (or data stream) at the receiver; and b) codebooks with matrix codebooks for use when there are multiple antennas at the transmitter and multiple antennas (or data streams) at the receiver. One of ordinary skill in the art would appreciate that in some instances in the present description, 'matrix' (or matrices) may refer to 'vector' (or vectors) as appropriate from the context.

A system operating in accordance with the IEEE 802.16e standard classifies codebooks as follows:
1. Vector Codebooks: 2, 3 or 4 transmitter antennas and 1 data stream; and
2. Matrix Codebooks: 2, 3 or 4 transmitter antennas and multiple data streams.

Each codebook corresponds to a combination of, $N_t$, S, and L, where $N_t$, S, and L are the numbers of antennas at the transmitter, available data streams (or receiver antennas being used) and the bits for the codeword feedback index, respectively. Codebooks are referred to using the following notation, $CB(N_t, S, L)$. Before data communication occurs, the transmitter and receiver specify the combination of transmitter antennas, $N_t$, data streams, S, and the feedback index length, L, that will be used. Once $N_t$, S and L have been specified, receiver 300 can search through the appropriate codebook for an appropriate codeword for the channel conditions being experienced by receiver 300. The number of codewords in a codebook is specified by $2^L$, such that for L=3 there are 8 codewords in a codebook and for L=6 there are 64 codewords.

The storage requirements of a codebook in a storage such as memory 304 is dependent upon the order ($N_t$ by S) of the codewords and the value of L. Consequently, a higher order codeword will take up more storage than a lower order codeword. Similarly, a codebook with $2^L$ codewords where L=6 will take up more space than a codebook with $2^L$ codewords where L=3. In order to minimize storage requirements in a storage such as memory 304, codebooks associated with higher order matrices are generated from codebooks associated with matrices or vectors of a lower order. The value of L selected affects the quantization error that results from how closely spaced codewords in a codebook are to each other.

Given that 'higher order' codebooks are generated from codebooks with matrices of a lower order, once the transmitter and receiver 300 specify the combination of transmitter antennas, $N_t$, data streams, S, and the feedback index length, L, that will be used, BFPSU 312 can 'search' in the appropriate 'codebook' for the appropriate codeword. As described below, in an embodiment of the invention, BFPSU 312 efficiently searches through a codebook with codewords that have an order that is less than $N_t$ by S in order to identify the appropriate codeword in $CB(N_t, S, L)$.

Figure 3A:
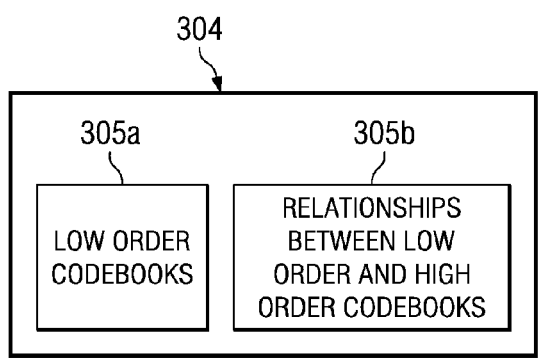
FIG. 3a illustrates in greater detail the memory of FIG. 2 according to an embodiment of the invention.

FIG. 3a illustrates in greater detail the memory of FIG. 2 according to an embodiment of the invention. Memory 304 of FIG. 2 stores low order codebook data structure (LOCDS) 305a and inter-codebook relationship data structure (ICRDS) 305b.

An example of a low order codebook is provided in Table 2, below, which shows the values of the 8 codewords for CB(2, 1, 3). LOCDS 305a also stores according to an embodiment of the invention the following codebooks CB(3, 1, 3), CB(4, 1, 3), CB(4, 1, 6).

TABLE 2

| $CB(N_t, S, L)$, where $N_t = 2$, $S = 1$, and $L = 3$ | | |
|---|---|---|
| Index | $v_1$ | $v_2$ |
| 000 or $V_1$ | 0 | 0 |
| 001 or $V_2$ | 0.794 | −0.580 + 0.182i |
| 010 or $V_3$ | 0.794 | 0.058 + 0.605i |
| 011 or $V_4$ | 0.794 | −0.298 − 0.530i |
| 100 or $V_5$ | 0.794 | 0.604 + 0.069i |
| 101 or $V_6$ | 0.329 | 0.661 + 0.674i |
| 110 or $V_7$ | 0.511 | 0.475 − 0.716i |
| 111 or $V_8$ | 0.329 | −0.878 − 0.348i |

As will be described in greater detail below, the following codebooks can be generated from CB(2, 1, 3), CB(3, 1, 3), CB(4, 1, 3), and CB(4, 1, 6): CB(2, 2, 3), CB(3, 3, 3), CB(4, 4, 3), and CB(4, 4, 6), respectively. ICRDS 305b includes an indication that $CB(N_t, N_t, L)$ codebooks can be generated from $CB(N_t, 1, L)$ codebooks, where $N_t$=2, 3, and 4. In alternative embodiment, the indication is not stored explicitly but is inherent in the operations that either control logic 302, BFPSU 312, or both perform in selecting a codeword in accordance with embodiments of the invention. One of ordinary skill in the art would appreciate that for the instances described herein in which codebooks are generated from other codebooks, the foregoing two statements, as modified for each instance under consideration, are also applicable and will not be repeated.

Using a transform known as a Householder reflection, $CB(N_t, N_t, L)$ codebooks can be generated from $CB(N_t, 1, L)$ codebooks, where $N_t$=2, 3, and 4, and L=3 or where $N_t$=4 and L=6. Accordingly, $CB(N_t, N_t, L)_i$=$H(CB(N_t, 1, L)_i)$ where H(v) is the Householder reflection transform and i is the index of the $i^{th}$ codewords in $CB(N_t, 1, L)$ and $CB(N_t, N_t, L)$. The Householder reflection is expressed in Eq. 1 below.

$$CB(N_t, N_t, L)_i = \begin{cases} I, & CB(N_t, 1, L)_i = e_1 \quad \text{Eq. 1} \\ I - 2\dfrac{(CB(N_t, 1, L)_i - e_1)(CB(N_t, 1, L)_i - e_1)^H}{(CB(N_t, 1, L)_i - e_1)^H(CB(N_t, 1, L)_i - e_1)}, & \text{otherwise} \end{cases}$$

It can be shown that $$CB(N_t, N_t, L)_{i,(:,1)} = CB(N_t, 1, L)_i \qquad \text{Eq. 2}$$

Given that $CB(N_t, N_t, L)_{i,(:,1)} = CB(N_t, 1, L)_i$, the result of operations performed on $CB(N_t, 1, L)_i$ and a vector derived from the channel estimate matrix, H, could be closely related to the result of similar operations performed on the same vector and $CB(N_t, N_t, L)$. However, operations performed on $CB(N_t, 1, L)_i$ and a vector derived from the channel estimate matrix, H, are relatively less computationally intensive because they involve lower order $N_t$ by 1 matrices (i.e., vectors) rather than higher order, $N_t$ by $N_t$, matrices.

Figure 4A:
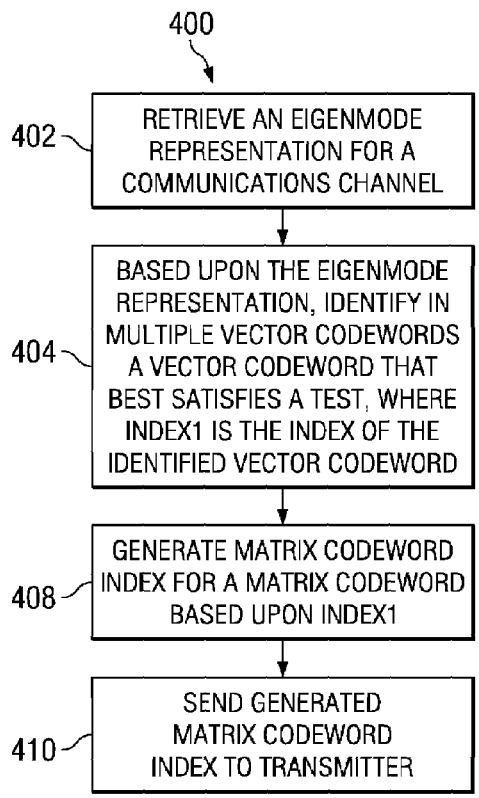
FIG. 4a illustrates a process for identifying a preceding matrix codeword according to an embodiment of the invention.

FIG. 4a illustrates a process for identifying a precoding matrix codeword according to an embodiment of the invention. Process 400 is performed when a codeword in any one of the following codebooks needs to be identified and its index sent to a transmitter: CB(2, 2, 3), CB(3, 3, 3), CB(4, 4, 3), and CB(4, 4, 6). Process 400 is also used in other situations as described in greater detail elsewhere herein. The codeword identification process performed for identifying a codeword in CB(2, 2, 3), CB(3, 3, 3), CB(4, 4, 3), or CB(4, 4, 6) is referred to herein as "codeword identification process 1 (CIP 1)."

In process 400, control logic 302 retrieves 402 from memory 304 an eigenmode representation for the channel between receiver 300 and a transmitter. An eigenmode representation of the channel is derived by singular value decomposition (SVD) of the channel estimate H as indicated by Eq. 3, below.

$$H = U\Sigma V^H, \qquad \text{Eq. 3}$$

where U and V are unitary matrices, and $\Sigma$ is a diagonal matrix containing singular values. The SVD of H is performed by control logic 302 in an embodiment and V, the eigenmode representation of H, is stored in memory 304. In an alternate embodiment, BFPSU 312 performs the SVD of H. The eigenmode representation of H that control logic 302 retrieves from memory 304 is, in an embodiment, $V_s$, the column of V that is the strongest eigenmode. In an alternative embodiment the columns of V are reordered by control logic 302 to produce $V_s$ in which the strongest eigenmodes of V are ordered in $V_s$ with the strongest eigenmode in the first column of $V_s$ and the second-strongest eigenmode is the in the second column and so forth for the remaining eigenmodes in V and columns in $V_s$. Control logic 302 then stores $V_s$ in memory 304.

'Eigenmode representation' as used herein, depending upon the context, refers to multiple eigenmodes, a single eigenmode, or may indicate that the phrase in which it is incorporated should be understood to alternately refer to multiple eigenmodes and a single eigenmode.

If a feedback channel to the transmitter was not constrained or limited, the matrix C would be the optimal beamforming matrix to send back from receiver 300. Since the feedback channel has limited bandwidth, a codeword matrix that allows the transmitter to best exploit the channel conditions between the transmitter and receiver 300 is identified. An index of the identified codeword matrix is then sent by receiver 300 to the transmitter.

Continuing with process 400, using the retrieved eigenmode representation CL 302 performs a test 404 on multiple vector codewords associated with a codebook to identify a codeword that best satisfies the test. The multiple vector codewords are those that are associated with $CB(N_t, 1, L)$ when a transmitter and receiver 300 are operating under the conditions where one of the following codebooks is applicable: CB(2, 2, 3), CB(3, 3, 3), CB(4, 4, 3), and CB(4, 4, 6). The conditions are $N_t=2$, 3, and 4, and L=3, or where $N_t=4$ and L=6.

Figure 4B:
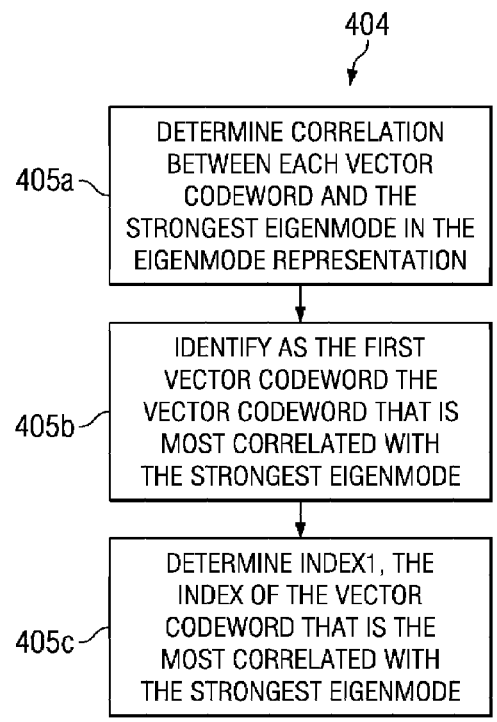
FIG. 4b illustrates in greater detail the test performed in FIG. 4a according to an embodiment of the invention.

FIG. 4b illustrates in greater detail the test performed in FIG. 4a according to an embodiment of the invention. In FIG. 4b, control logic 302 performs the test 404 by determining 405a the correlation between each of the vector codewords in $CB(N_t, 1, L)_i$, where $1 \leq i \leq 8$, and the first column of $V_s$, the strongest eigenmode in V. In the case where conditions require that test 404 of process 400 be as described in FIG. 4b, the eigenmode representation retrieved 402 is the strongest eigenmode in V.

In an embodiment, where $V_s$ is a vector that holds the strongest eigenmode of V, control logic 302 determines 405a the correlation between each of the codewords in $CB(N_t, 1, L)$, where $1 \leq i \leq 8$, and $V_s$. Control logic 302 then identifies 405b the vector codeword that has the strongest correlation with the strongest eignmode of V, and determines index 1, the index of the vector codeword in $CB(N_t, 1, L)$ that is most correlated with the strongest eigenmode of $V_s$.

Returning to process 400 of FIG. 4a, based upon index1, control logic 302 generates 408 a matrix codeword index for a codeword in $CB(N_t, N_t, L)$, where $N_t=2$, 3, or 4, and L=3, or where $N_t=4$ and L=6. Since both the receiver and transmitter are aware of values of $N_t$ and L under which they are operating, the matrix codeword index generated by control logic 302 uniquely identifies a particular codeword in a particular codebook. The matrix codeword index that is generated is equivalent to index 1, the index of the vector codeword in $CB(N_t, 1, L)$ that is most correlated with the strongest eigenmode of $V_s$. Control logic 408 sends 410 the generated matrix codeword index to the transmitter with which receiver 300 is communicating.

Process 400 of FIG. 4a and operation 404 of FIG. 4b, as they apply to CB(2, 2, 3), CB(3, 3, 3), CB(4, 4, 3), and CB(4, 4, 6), can be compactly represented by the following statements and equations:

1. Find the index of the codeword from $CB(N_t, 1, L)$ that is most correlated to the first column of $V_s$.

$$index1 = \underset{i=1,\ldots,2^L}{\mathrm{argmax}} (CB(N_t, 1, L)_i^H V_{s,(:,1)}) \qquad \text{Eq. 4}$$

2. Select the matrix codeword with the same index in the codebook.

$$\hat{V} = CB(N_t, N_t, L)_{index1} \qquad \text{Eq. 5}$$

The selected matrix codeword, $\hat{V}$, has its first column most correlated with the dominant eigenmode of the channel.

Process 400 can also be used in other situations. In cases where receiver 300 and a transmitter are communicating with either a) $N_t=3$, $S=2$, $L=3$, b) $N_t=4$, $S=3$, $L=3$, or c) where $N_t=4$, $S=3$, and $L=6$, then either CB(3, 2, 3), CB(4, 3, 3) or CB(4, 3, 6) is applicable, respectively. In such cases, process 400 proceeds with operation 402 as described above, but operation 404 is performed as described in FIG. 4c. The codeword identification process performed for identifying a codeword in CB(3, 2, 3), CB(4, 3, 3) or CB(4, 3, 6) is referred to herein as "codeword identification process 2 (CIP 2)."

Figure 4C:
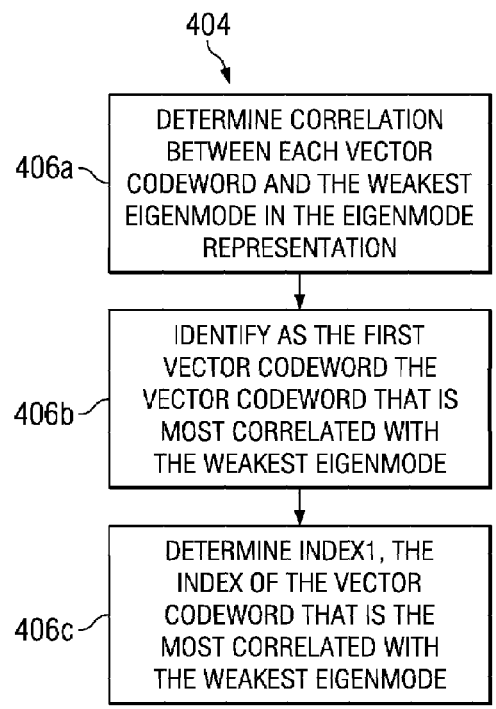
FIG. 4c illustrates in greater detail the test performed in FIG. 4a according to an alternative embodiment of the invention.

FIG. 4c illustrates in greater detail the test performed in FIG. 4a according to an alternative embodiment of the invention. This is so because CB(3, 2, 3), CB (4, 3, 3) or CB (4, 3, 6) are generated from $CB(N_t, 1, L)$ using a Householder expansion transformation, HE(CB), rather than a Householder reflection transformation. A Householder expansion transformation is derived from a Householder reflection transformation as expressed generally in the following equation, $HE(v)=H(v)_{:,2:N}$. More specifically, $CB(N_t, S, L)$ where a) $N_t=3$, $S=2$, $L=3$, b) $N_t=4$, $S=3$, $L=3$, or c) $N_t=4$, $S=3$, and $L=6$, is derived from a Householder expansion of $CB(N_t, 1, L)$ as described in Eq. 6, below.

$$CB(N_t,S,L)_i = H(CB(N_t,1,L)_i)_{(:,2:N)} \quad \text{Eq. 6}$$

It can be shown that the two codebooks specified in Eq. 7 for each index i, $1 \leq i \leq 2^L$, have orthogonal codewords, where a) $N_t=3$, $S=2$, $L=3$, b) $N_t=4$, $S=3$, $L=3$, or c) $N_t=4$, $S=3$, and $L=6$.

$$CB(N_t,S,L)_i \perp CB(N_t,1,L)_i \quad \text{Eq. 7}$$

Consequently, instead of test 404 in process 400 being the determination of the codeword in $CB(N_t, 1, L)$ that is most correlated with the strongest eigenmode as illustrated in FIG. 4B, the test is rather to determine the codeword in $CB(N_t, 1, L)$ that is most correlated with the weakest eigenmode. Thus, test 404 in process 400 is as described in FIG. 4c.

In FIG. 4c, control logic 302 performs the test 404 by determining 406a the correlation between each of the vector codewords in $CB(N_t, 1, L)_i$, where $1 \leq i \leq 8$, and, $V_w$ is the weakest eigenmode in V. In an embodiment, where $V_w$ is a vector that holds the weakest eigenmode of V, control logic 302 determines 405a the correlation between each of the codewords in $CB(N_t, 1, L)_i$ and $V_w$, where $1 \leq i \leq 8$. Control logic 302 then identifies 406b the vector codeword that has the strongest correlation with the weakest eignmode of V, and determines index 1, the index of the vector codeword in $CB(N_t, 1, L)_i$, that is most correlated with the weakest eigenmode of $V_w$. In the case where conditions require that test 404 of process 400 be as described in FIG. 4c, the eigenmode representation retrieved 402 is the weakest eigenmode in V.

The eigenmode representation of H that control logic 302 retrieves from memory 304 is, in an embodiment, $V_w$, the column of V that is the weakest eigenmode. In an alternative embodiment the columns of V are reordered by control logic 302 to produce $V_w$ in which the weakest eigenmodes of V are ordered in $V_w$ with the weakest eigenmode in the last column of $V_w$ and the second-weakest eigenmode is the in the second to last column and so forth for the remaining eigenmodes in V and columns in $V_w$. Control logic 302 then stores $V_w$ in memory 304.

Returning to process 400 of FIG. 4a, based upon index1, control logic 302 generates 408 a matrix codeword index for a codeword in CB($N_t$, S, L), where a) $N_t=3$, $S=2$, $L=3$, b) $N_t=4$, $S=3$, $L=3$, or c) where $N_t=4$, $S=3$, and $L=6$. Since both the receiver and transmitter are aware of values of $N_t$, S and L under which they are operating, the matrix codeword index generated by control logic 302 uniquely identifies a particular codeword in a particular codebook. The matrix codeword index that is generated is equivalent to index1, the index of the vector codeword in $CB(N_t, 1, L)$ that is most correlated with the weakest eigenmode of V. Control logic 408 sends 410 the generated matrix codeword index to the transmitter with which receiver 300 is communicating. The matrix codeword identified by the generated matrix codeword index, in relation to the other codewords in its codebook, has the shortest chordal distance to $V_s$.

Process 400 of FIG. 4a and operation 404 of FIG. 4c, as they apply to CB(3, 2, 3), CB(4, 3, 3), and CB(4, 3, 6) can be compactly represented by the following statements and equations.

1. Find the index of the vector codeword from $CB(N_t, 1, L)$ that is most correlated with the weakest eigenmode of V (i.e. $V_w$).

$$ind = \underset{i=1,\ldots,2^L}{\mathrm{argmax}} (CB(N_t, 1, L)_i^H V_w) \quad \text{Eq. 8}$$

2. Select the matrix codeword with the same index in the codebook.

$$\hat{V} = CB(N_t, S, L)_{ind} \quad \text{Eq. 9}$$

The selected matrix codeword minimizes the chordal distance to VS.

Figure 5A:
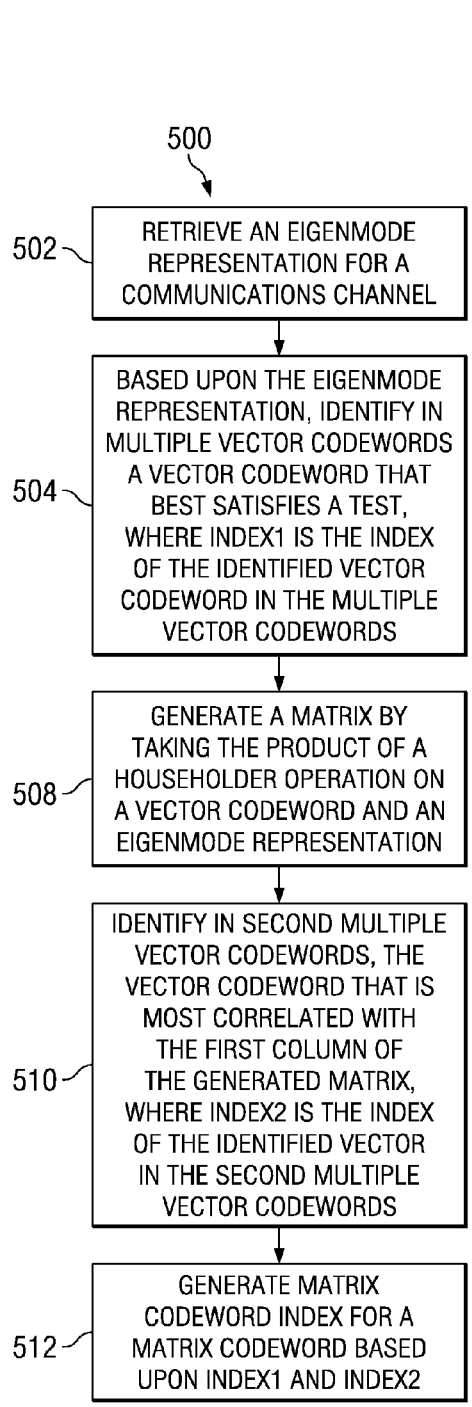
FIG. 5a illustrates a process for identifying a precoding matrix codeword according to an embodiment of the invention.

FIG. 5a illustrates a process for identifying a precoding matrix codeword according to an embodiment of the invention. Process 500 is performed when a codeword in any one of the following codebooks needs to be identified and its index sent to a transmitter: CB(3, 2, 6), and CB(4, 2, 6). Process 500 is also used in other situations as described in greater detail elsewhere herein. The codeword identification process performed for identifying a codeword in CB(3, 2, 6), or CB(4, 2, 6) is referred to herein as "codeword identification process 3 (CIP 3)."

CB(3, 2, 6) and CB(4, 2, 6) are generated by a Householder concatenation transformation which is expressed generally by Eq. 10, below.

$$HC(v, A) = H(v) \begin{bmatrix} 1 & 0 \\ 0 & \\ \vdots & A \\ 0 & \end{bmatrix} \quad \text{Eq. 10}$$

More specifically, CB($N_t$, S, L), where a) $N_t=3$, $S=2$, $L=6$, or b) $N_t=4$, $S=2$, $L=6$ is derived from the Householder concatenation of $H(CB(N_t,1,L))$ and the following matrix $$\begin{bmatrix} 1 & 0 \\ 0 & \\ \vdots & CB(N_t-1, 1, 3)_j \\ 0 & \end{bmatrix}$$

as also described in Eq. 11, below.

$$CB(N_t, 2, 6)_{8(i-1)+j} = H(CB(N_t, 1, 3)_i) \begin{bmatrix} 1 & 0 \\ 0 & \\ \vdots & CB(N_t-1, 1, 3)_j \\ 0 & \end{bmatrix} \quad \text{Eq. 11}$$

where $1 \leq i \leq 8$ and $1 \leq j \leq 8$.

It can be shown that $$CB(N_t, 2, 6)_{8(i-1)+1:8i(:,1)} = CB(N_t, 1, 3)_i \quad \text{Eq. 12}$$

In process 500, control logic 302 retrieves 502 from memory 304 an eigenmode representation for the channel between receiver 300 and a transmitter. The eigenmode representation of H that is retrieved from memory 304 is $V_s$, which control logic 302, in an embodiment, produces by ordering in $V_s$ the strongest eigenmode of V in the first column of $V_s$ and the second-strongest eigenmode is the in the second column of $V_s$ and so forth for the remaining eigenmodes in V and columns in $V_s$.

Continuing with process 500, using the retrieved eigenmode representation CL 302 performs a test 504 on multiple vector codewords associated with a codebook to identify a codeword that best satisfies the test. The multiple vector codewords are those that are associated with $CB(N_t, 1, L)$ when a transmitter and receiver 300 are operating under the conditions where one of the following codebooks is applicable: CB(3, 2, 6), and CB(4, 2, 6). The conditions are $N_t=3$ or 4, S=2 and L=6.

Figure 5B:
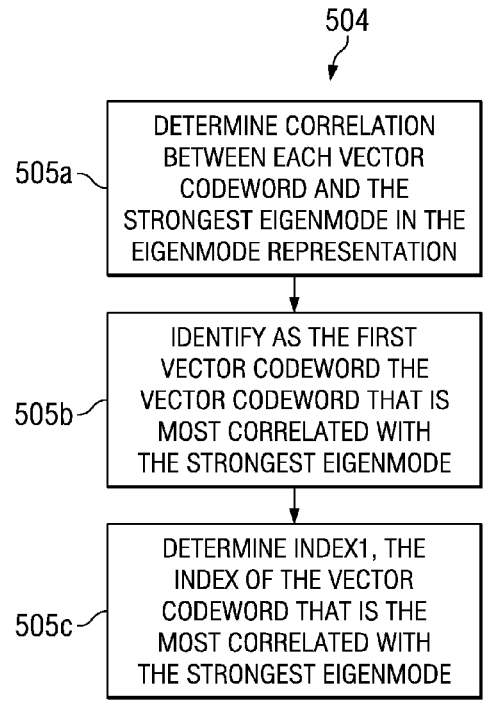
FIG. 5b illustrates in greater detail the test performed in the process described in connection with FIG. 5a according to an embodiment of the invention.

FIG. 5b illustrates in greater detail the test performed in the process described in connection with FIG. 5a according to an embodiment of the invention. In FIG. 5b, control logic 302 performs the test 504 by determining 505a the correlation between each of the vector codewords in $CB(N_t, 1, L)_i$ where $1 \leq i \leq 8$, and the first column of $V_s$, the strongest eigenmode in V. In the case where conditions require that test 504 of process 500 be as described in FIG. 5b, the eigenmode representation retrieved 502 is the strongest eigenmode in V.

In an alternative embodiment, where $V_s$ is a vector that holds the strongest eigenmode of V, control logic 302 determines 505a the correlation between each of the codewords in $CB(N_t, 1, L)_i$ where $1 \leq i \leq 8$, and $V_s$.

Control logic 302 then identifies 505b the vector codeword that has the strongest correlation with the strongest eignmode of V, and determines index1 505c, the index of the vector codeword in $CB(N_t, 1, L)_i$, where $1 \leq i \leq 8$, that is most correlated with the strongest eigenmode of $V_s$.

Returning to process 500 of FIG. 5a, control logic 302 then generates 508 a matrix by taking the product of a Householder operation on a vector codeword and an eigenmode representation.

Figure 5C:
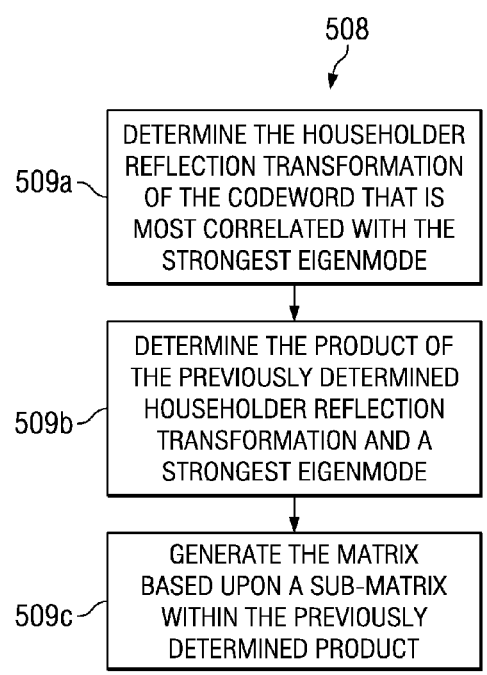
FIG. 5c illustrates in greater detail the matrix generation of the process described in connection with FIG. 5a according to an embodiment of the invention.

FIG. 5c illustrates in greater detail the matrix generation of the process described in connection with FIG. 5a according to an embodiment of the invention. In FIG. 5c, control logic 302 generates a matrix by performing a Householder reflection transformation 509a on the vector codeword $CB(N_t, 1, L)_{index1}$ whose index1 was determined 505c earlier. Control logic 302 then determines 509b the product of the Householder reflection transformed vector codeword and $V_s$, the strongest eignmode representation, where $V_s$ is a $N_t$ by 2 matrix, for $N_t=3$ or 4 as required by the starting conditions of process 500.

The product that is determined 509b is a $N_t$ by 2 matrix with the following form:

$$\begin{bmatrix} e^{j\phi} & \sim 0 \\ \sim 0 & \\ \vdots & w \\ \sim 0 & \end{bmatrix}$$

where w is a 2 by 1 (or 3 by 1 depending on $N_t$) matrix, and $\phi$ is close to 0. Control logic 302 then generates 509c the matrix w.

Returning to process 500 of FIG. 5a, control logic 302 identifies 510 in second multiple vector codewords, the vector codeword that is most correlated with the first column of the generated matrix, where index2 is the index of the identified vector in the second multiple vector codewords. The second multiple vector codewords that are tested 510 by control logic 302 are $CB(N_t, 1, L)_i^H$, where $1 \leq i \leq 8$. Control logic then generates 512 an index for a matrix codeword based upon index1 and index2 where the generated index is equivalent to 8(index 1-1)+index2 and the matrix codeword being identified for the transmitter is $CB(N_t,2,6)_{8(index1-1)+index2}$, where $N_t$ is either 3 or 4.

Since both the receiver and transmitter are aware of values of $N_t$ and L under which they are operating, the matrix codeword index generated by control logic 302 uniquely identifies a particular codeword in a particular codebook. The matrix codeword index that is generated identifies a codeword in $CB(N_t, 2, 6)_j$, $1 \leq j \leq 64$ whose columns are most correlated with the columns $V_s$.

Process 500 of FIG. 5a and operations 504, 508 of FIGS. 5b, 5c, as they apply to CB(3, 2, 6) and CB(4, 2, 6) can be compactly represented by the following statements and equations:

1. Find index of codeword from $CB(N_t, 1, 3)$ that is most correlated to the first column of $V_s$.

$$index1 = \underset{i=1...8}{\operatorname{argmax}}(CB(N_t, 1, 3)_i^H V_{s,(:,1)}) \quad \text{Eq. 13}$$

2. Define W as follows $$W = H(CB(N_t, 1, 3)_{index1}) \quad \text{Eq. 14}$$

$$V_s = \begin{bmatrix} e^{j\phi} & \sim 0 \\ \sim 0 & \\ \vdots & w \\ \sim 0 & \end{bmatrix}$$

The structure of W is as given in Eq. 14 due to the unitary nature of $H(CB(N_t, 1,3)_{ind_1})$ and $V_s$ and the strong correlation given in Eq. 13.

3. Find index of codeword from $CB(N_t-1, 1, 3)$ that is most correlated to w.

$$index2 = \underset{i=1...8}{\operatorname{argmax}}(CB(N_t - 1, 1, 3)_i^H w) \quad \text{Eq. 15}$$

4. Select matrix codeword as $$\hat{V} = CB(N_t,2,6)_{8(index1-1)+index2} \quad \text{Eq. 16}$$

The selected matrix codeword has columns that are correlated with columns of $V_s$.

Process 500 of FIG. 5a and operations 504 and 508 of FIGS. 5b, 5c also apply to generating a matrix codeword index for identifying a matrix codeword in CB(3, 3, 6). The codeword identification process performed for identifying a codeword in CB(3, 3, 6) is referred to herein as "codeword identification process 4 (CIP 4)." CB(3, 3, 6) is a generated from the Householder concatenation transformation for two codebooks, CB(3, 1, 3) and CB(2, 1, 3) as described by Eq. 17, below.

$$CB(N_t, 3, 6)_{8(i-1)+j} = H(CB(N_t, 1, 3)_i) \begin{bmatrix} 1 & 0 \\ 0 & \\ \vdots & H(CB(N_t-1, 1, 3)_j) \\ 0 & \end{bmatrix} \qquad \text{Eq. 17}$$

where $1 \leq i \leq 8$ and $1 \leq j \leq 8$.

There is a salient difference between process 500 and operations 504, 508 as they apply to CB(3, 3, 6) as opposed to CB(3, 2, 6), and CB(4, 2, 6) for which their application was described in greater detail above. Consequently, one of ordinary skill in the art would appreciate that it is not necessary to repeat most of the description of process 500 and operations 504, 408. A salient difference arises when control logic 302 determines the product 509b of the Householder reflection transformation of a vector codeword and the representation of the strongest eigenmodes. Instead of the product being a 3 by 2 or 4 by 2 matrix, the product, W—described in greater detail below—is a 3 by 3 matrix, and w—described in greater detail below—is a 2 by 2 matrix rather than a 2 by 1 or 3 by 1 matrix.

Process 500 of FIG. 5a and operations 504, 508 of FIGS. 5b, 5c, as they apply to CB(3, 3, 6) can be compactly represented by the following statements and equations:

1. Find index of codeword from CB($N_t$, 1, 3) that is most correlated to the first column of $V_s$.

$$index1 = \underset{i=1 \ldots 8}{\mathrm{argmax}}(CB(N_t, 1, 3)_i^H V_{s(:,1)}) \qquad \text{Eq. 18}$$

2. Define W as follows $$W = H(CB(N_t, 1, 3)_{index1}) V_s = \begin{bmatrix} e^{j\phi} & \sim 0 & \cdots & \sim 0 \\ \sim 0 & & & \\ \vdots & & \tilde{V} & \\ \sim 0 & & & \end{bmatrix} \qquad \text{Eq. 19}$$

The structure of W is as given in Eq. 19 due to the unitary nature of $H(CB(N_t,1,3)_{ind_1})$ and $V_s$ and the strong correlation given in Eq. 18.

3. Find index of codeword from CB($N_t$-1, 1, 3) that is most correlated to the first column of $\tilde{V}$.

$$index2 = \underset{i=1 \ldots 8}{\mathrm{argmax}}(CB(N_t-1, 1, 3)_i^H \tilde{V}_{(:,1)}) \qquad \text{Eq. 20}$$

4. Select matrix codeword as $$\hat{V} = CB(N_t, 3, 6)_{8(index1-1)+index2} \qquad \text{Eq. 21}$$

The selected matrix codeword has its first two columns most correlated with the first two columns of $V_s$.

Some of the processes described herein are relatively computationally less intensive because, among other things, they involve vector codewords rather than matrix codewords. Table 3 below provides expressions for calculating the number of computations required by each of processes CIP 1, CIP 2, CIP 3, and CIP 4.

TABLE 3

| Process | Additions | Multiplications | Division | SVD |
|---|---|---|---|---|
| CIP 1 | $2^L(N_t - 1)$ | $2^L N_t$ | 0 | 1 |
| CIP 2 | $2^L(N_t - 1)$ | $2^L N_t$ | 0 | 1 |
| CIP 3 | $(S - 1)N_t^2 + (21 - 2S)N_t + S - 26$ | $SN_t^2 + (18 - S)N_t - 7$ | $N_t^2$ | 1 |
| CIP 4 | $(S - 1)N_t^2 + (21 - 2S)N_t + S - 26$ | $SN_t^2 + (18 - S)N_t - 7$ | $N_t^2$ | 1 |

As described in greater detail herein, in an alternative embodiment a codeword identification process performs computationally intensive operations in an efficient manner. An example of a computationally intensive operation is determining the matrix codeword in a codebook that maximizes the SNR for a signal that has been processed by a minimum mean square error (MMSE) receiver. Another example of a computationally intensive operation is determining the matrix codeword in a codebook that minimizes chordal distance between the codeword that spans the subspace closest to the subspace spanned by $V_s$.

Maximizing SNR or minimizing chordal distance are examples of selection criteria for selecting a matrix codeword in a codebook. Almost every selection criterion—additional ones besides the foregoing two are described elsewhere herein—requires an exhaustive search over all codebook entries. This is feasible for 8 element codebooks but may in some instances be difficult, but not impossible, to achieve for 64 element codebooks.

Nevertheless, a practical implementation of an IEEE 802.16e system with 1024-pt FFT for OFDMA has a total of up to 768 subcarriers used for data. Consequently, the amount of computing power required to determine optimum precoding matrices for all subcarriers becomes overwhelming. With a feedback latency of only 25 ms, the task of completing these computations may not be possible for some implementations. In the case of band AMC operation, the transmitter can request a precoding matrix per band. The number of bands can vary between 16 and 96 depending on how many bins are allocated per band. This is one method for reducing computation: namely, by selecting a common precoding matrix for multiple subcarriers.

However, irrespective of whether AMC band operation is selected or not, in an alternative embodiment, receiver 300 performs a process that is used to identify precoding matrices in a computationally efficient manner. A process is used in an embodiment to determine a preceding matrix for multiple subcarriers for embodiments in which AMC band operation is available. An alternative process is used in an alternative embodiment to determine a precoding matrix for subcarriers when AMC band operation is not available or, in an alternative embodiment, not selected.

The processes involve reducing the search space for optimum precoding matrices by exploiting channel correlation over time. The assumption being made is that for slow fading channels the optimum codewords for correlated channels are similar to one another.

In practical terms this means that if a codeword that satisfies a selection criterion is identified at time $t_0$, for a downlink frame, then at time $t_0+\delta$, for the immediately following downlink frame, in a slow fading channel, it is likely that the optimum or near optimum codeword is one that is similar to the codeword identified at time $t_0$. Consequently, it would make sense then to search for a codeword for time $t_0+\delta$ by searching among the codewords that are most similar to the codeword identified for time $t_0$, where $\delta$ is the time between consecutive downlink frames. The search is not performed over all codewords in the codebook but rather among a smaller integer number, n, which, according to an embodiment, is set and is changed by the process. The same type of search is done at $t_0+2\delta$, $t_0+3\delta$, and $t_0+4\delta$, in an embodiment. In order to limit error propagation, an exhaustive search is performed every 5 downlink frames, and the codeword that results from the exhaustive search is used to determine the group of codewords that will be searched during the next 4 downlink frames.

The process then becomes one of searching through codewords that have been organized and ordered in accordance with their similarity to each other and searching through a number of codewords, n, that is less than $2^L$. According to one embodiment of the invention, memory 304 stores a $2^L$ by p lookup table, where $n \leq p$ and p is the maximum number of similar codewords stored in the table for each codeword. In an embodiment, $p=2^L$, but is less in an alternative embodiment.

Figure 3B:
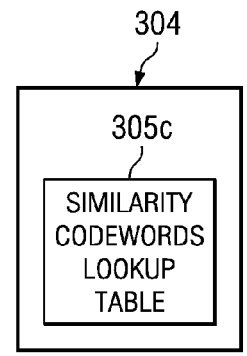
FIG. 3b illustrates, according to one embodiment of the invention, the memory of FIG. 2 storing a lookup table for codewords organized according to their similarity to each other.

FIG. 3b illustrates, according to one embodiment of the invention, the memory of FIG. 2 storing a lookup table for codewords organized according to their similarity to each other. Memory 304 includes lookup table 305c. The $(i,j)^{th}$ entry in table 305c holds the codeword index of the $j^{th}$ most similar codeword to $CB(N_t, S, L)_i$. Hence the elements in the $i^{th}$ row are indices of codewords sorted in descending order of similarity to $CB(N_t, S, L)_i$. According to an embodiment similarity is measured using chordal distance as the similarity metric. This metric quantifies the similarity of the subspaces spanned by the columns of two matrices, A and B, (i.e., two codewords being compared) and is given by Eq. 22, below:

$$cd(A, B) = \frac{1}{\sqrt{2}} \|AA^H - BB^H\|_F \qquad \text{Eq. 22}$$

When the chordal distance between codewords is used as the similarity metric and the selected codebook has a circulant chordal distance structure, then only a lookup vector is required. Codebooks with a circulant chordal distance structure include, but are not limited to, CB(3, 1, 3), CB(4, 1, 3), and CB (4, 3, 6). The lookup vector stores the offset to indices of the codebook entries rather than the true indices themselves to save memory. Thus, where a selected codebook has a circulant chordal distance structure, the $i^{th}$ entry in the lookup vector would correspond to the $i^{th}$ most similar codeword to the current codeword. The index, in the codebook, of this codeword is given by the index of the current codeword plus the $i^{th}$ entry in the lookup vector.

In an alternative embodiment similarity is measured using columnwise correlation as the similarity metric. This metric quantifies the correlation between the columns of two matrices, A and B, (i.e., two codewords) and is given by Eqs. 23, below:

$$Q = A^H B \qquad \text{Eqs. 23}$$

$$Q_{(m,n)} = A^H_{(:,m)} B_{(:,n)}$$

$$corr(A, B) = \max_n \sqrt{\sum_k |Q_{(m_k, n_k)}|^2} ;$$

$$m = [1 \ldots M],$$

$$n = \text{perm}([1 \ldots M])$$

Figure 6A:
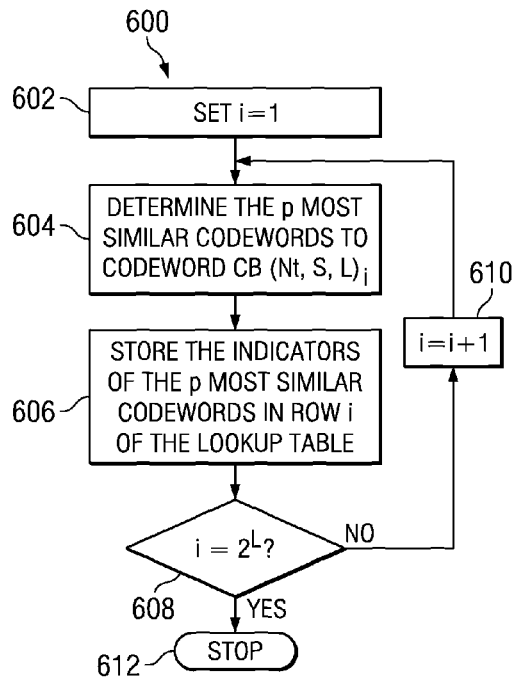
FIG. 6a illustrates a process for generating a codeword similarity lookup table in accordance with an embodiment of the invention.

FIG. 6a illustrates a process for generating a codeword similarity lookup table in accordance with an embodiment of the invention. Process 600 is performed by a general purpose computer (not shown) and the lookup table generated by the computer is stored, in an embodiment, in the memory, such as memory 304, of a receiver, such as receiver 300. In process 600, a counter, i, is initialized 602 and a similarity metric and codebook $CB(N_t, S, L)$ are selected. The p most similar codewords to $CB(N_t, S, L)_i$ are identified 604 and indicators of their location in $CB(N_t, S, L)_i$ are stored 606 in row i of the lookup table. In an embodiment, the indicators are indices of the codewords. In an alternative embodiment, depending on the codebook for which a lookup table is being generated, the indicators are offsets between the index of the codeword associated with row i and the indices of the codewords most similar to it.

Figure 6B:
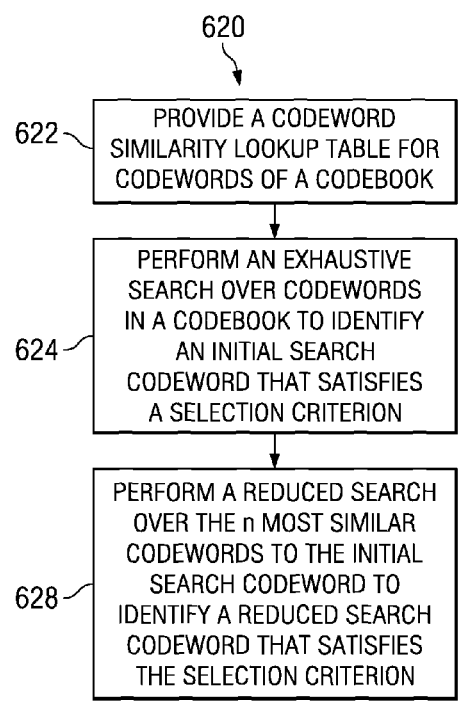
FIG. 6b illustrates, according to an embodiment of the invention, a process for determining codewords that satisfy a selection criterion.

FIG. 6b illustrates, according to an embodiment of the invention, a process for determining codewords that satisfy a selection criterion. In process 620, memory 304 includes 622 a similarity codeword lookup table 305c (see FIG. 3b) for a codebook. The table is generated in accordance with an embodiment of the invention. The lookup table in an embodiment has rows in which entries for each row are indicators that identify codewords that are ordered in decreasing order of similarity as measured by a similarity metric. In an embodiment the similarity metric is chordal distance, but in an alternative embodiment the similarity metric is columnwise correlation or alternatively some other similarity metric known in this or a related art. In an embodiment the indicators are indices of codewords in the codebook associated with the similarity codeword lookup table. In an alternative embodiment, the indices are offsets between codewords which are similar.

Continuing with process 620, control logic 302 performs an exhaustive search 624 over all codewords in the codebook associated with the similarity codeword lookup table. Control logic 302 identifies 624 an initial search codeword that satisfies a selection criterion.

Depending upon the embodiment, one or more selection criteria may be available for control logic 302 to use in its search 624. In an embodiment, the selection criterion is maximizing the post-minimum-mean-square-error-receiver SNR (MaxMMSESNR). This criterion can be implemented as given in Eqs. 24 below.

$$SNR_{MMSE}(V_i) = \min_{k=1...S} \frac{E_t}{SN_0 \left[ V_i^H H^H H V_i + \left( \frac{SN_0}{E_t} \right) I_S \right]^{-1}_{k,k}} - 1 \quad \text{Eqs. 24}$$

$$\hat{V} = \underset{V_i}{\operatorname{argmax}}(SNR_{MMSE}(V_i))$$

An alternative criterion is to minimize the chordal distance to $V_s$ (MinChordal) by choosing the codeword that spans the subspace closest to the subspace spanned by $V_s$. This criterion can be implemented by Eq. 25 below.

$$\hat{V} = \underset{V_i; i=1...2^L}{\operatorname{argmax}} \frac{1}{\sqrt{2}} \| V_i V_i^H - V_s V_s^H \|_F \quad \text{Eq. 25}$$

For vector codebooks, it can be shown that this criterion is identical to selecting the codeword that is most correlated with the dominant eigenmode of the channel. One of ordinary skill in the art would appreciate that this criterion is not applicable to square matrix codewords, where $N_t = S$ because all codebook entries will span the same space.

In an alternative embodiment, the selection criterion is to maximize the correlation between the columns of a codeword and the columns of $V_s$ (MaxColCorr). This criterion is implemented by control logic 302 using the following expressions, Eqs. 26.

$$Q_i = \Sigma V_s^H V_i \quad \text{Eqs. 26}$$

$$Q_{i,(m,n)} = \sigma_m V_{s,(:,m)}^H V_{i,(:,n)}$$

$$C(V_i) = \max_n \sqrt{\sum_k |Q_{i,(m_k, n_k)}|^2} \; ;$$

$$m = [1 \dots S],$$

$$n = \operatorname{perm}([1 \dots S])$$

$$\hat{V} = \underset{V_i}{\operatorname{argmax}}(C(V_i))$$

In the first operation in Eqs. 26, $\Sigma$ can be set equal to I in order to give equal weight to all the columns. The third operation, $C(V_i)$, allows column permutations since permuting the columns is equivalent to permuting the input data streams.

An alternative criterion is to maximize the gain of the data stream with the lowest gain at the receiver antennas (MaxRx-Gain). This criterion can be implemented using the following expressions, Eqs. 27.

$$Q_i = H V_i \quad \text{Eqs. 27}$$

$$\therefore Q_i [\, q_{i,1} \; \cdots \; q_{i,S} \,]$$

$$C(V_i) = \min_k (q_{i,k}^H q_{i,k})$$

$$\hat{V} = \underset{V_i}{\operatorname{argmax}}(C(V_i))$$

An example of yet another selection criterion would be minimization of inter-data stream interference by maximizing the 'distance', MaxDist, between the streams. The goal of the MaxDist criterion is to maximize the gain at the receiver antennas and, at the same time, to minimize the inter stream interference.

If, as a consequence of a particular precoding matrix, data streams are transmitted along two eigenmodes, then the data transmitted along a weak eigenmode would be severely attenuated. Hence, even though the data streams are received in orthogonal directions, the weak data stream is dominated by noise and is prone to errors. Alternatively, if, as a consequence of another precoding matrix, two data streams are transmitted along directions such that the minimum stream gain at the receiver is maximized, the effect of noise at the receiver will be minimized. However, the two received data streams would have very similar gain and directions and would be prone to interfering with one another. A preferable precoding matrix would be one that sacrifices some gain in order to reduce inter-stream interference. Selecting a preceding matrix that balances gain against reduced inter-stream interference is the objective of the MaxDist criterion.

The MaxDist criterion is implemented using the following expressions, Eqs. 28:

$$Q_i = H V_i$$

$$\therefore Q_i = [\, q_{i,1} \; \cdots \; q_{i,S} \,]$$

$$C_1(V_i) = \min_k (q_{i,k}^H q_{i,k})$$

$$C_2(V_i) = \min_{\substack{j,k \\ j \neq k}} \frac{\| \| q_{i,j} \| - \| q_{i,k} \| \| + \varepsilon}{|q_{i,j}^H q_{i,k}| + \varepsilon}$$

$$\hat{V} = \underset{V_i}{\operatorname{argmax}}(\min(C_1(V_i), C_2(V_i)))$$

The columns of $Q_i = [q_{i,1} \ldots q_{i,S}]$ represent the magnitude and directions of the received data streams. $C_1(\bullet)$ determines the minimum stream gain. $C_2(\bullet)$ attempts to minimize the inter stream interference. The denominator of $C_2(\bullet)$ determines the correlation between pairs of data streams. If the amount of correlation is low, then the probability of interference is low and $C_2(\bullet)$ gets a high value. If two of the data streams are received in highly correlated directions then the numerator of $C_2(\bullet)$ attempts to maximize the difference between the gains. It is true that in order to maximize the difference between the gains, one could reduce the gain of one direction to 0. However this does not happen due to the final condition in Eqs. 28, $\hat{V}$, that finds the precoding matrix that maximizes the minimum of $C_1(\bullet)$ and $C_2(\bullet)$.

One of ordinary skill in the art would appreciate that there are numerous selection criteria that can be used depending upon the embodiment, including one or more of the criteria that are described herein. A selection criterion maximizes a performance measure such as SNR or maximizes a measure that is related to throughput such as correlation with the dominant eigenmode(s) of the channel estimate. Thus, one of ordinary skill in the art would appreciate that the invention is not limited to any particular selection criterion, whether described herein or not.

Referring again to process 620 of FIG. 6b, after performing an exhaustive search, for at least one more downlink frame, control logic 302 performs 628 a reduced space search in the row associated with the identified initial search codeword. Control logic 302 performs a search 628 in the first n entries of the row to identify a reduced search codeword that satisfies the same criterion used earlier. The number of entries searched, n, is an implementation detail and can vary. In an embodiment, for a 64 codeword codebook, n is 32. In alternative embodiment, control logic 302 uses a different criterion than the one used in the exhaustive search.

In an embodiment, control logic 302 repeats 628 the reduced search space search for each of the next 3 downlink frames. In an embodiment, for every five downlink frame control logic 302 performs 624 an exhaustive search. One of ordinary skill in the art would appreciate that the rate at which exhaustive searches are done in terms of the number of downlink frames is an implementation detail which will vary.

In an embodiment, for a certain downlink frame, control logic 302 performs an exhaustive search in which it identifies an initial search codeword and a row associated with the initial search codeword. For a certain number of subsequent downlink frames, control logic 302 performs, a reduced search in the row associated with the codeword identified in a previous search, whether an exhaustive search or a reduced search. Until control logic 302 performs an exhaustive search again, control logic 302 changes the row in which it performs a reduced search depending upon the codeword identified in an earlier reduced search.

Figure 6C:
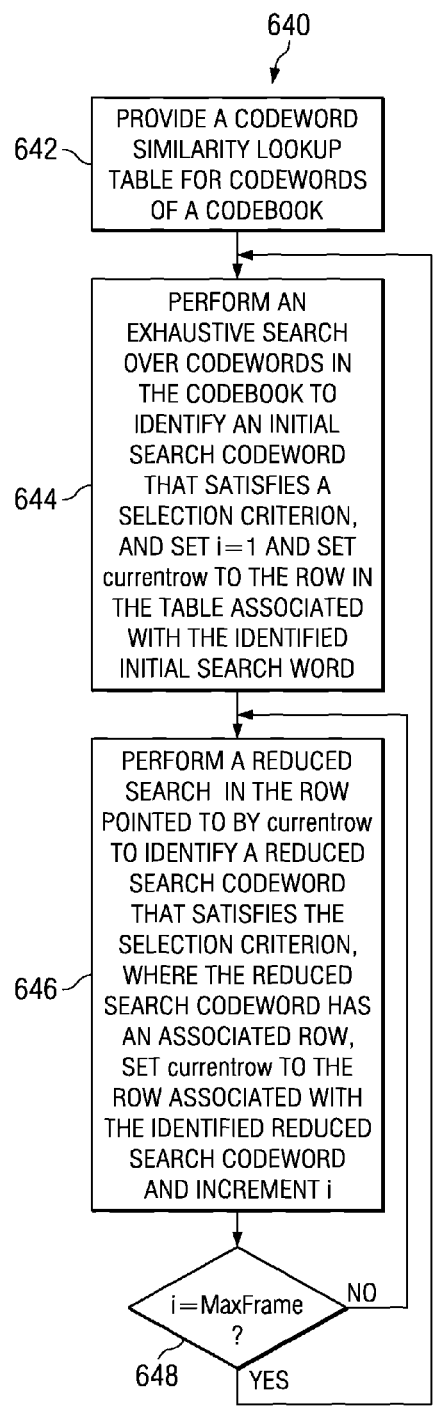
FIG. 6c illustrates, according to an alternative embodiment of the invention, a process for determining codewords that satisfy a selection criterion.

FIG. 6c illustrates, according to an alternative embodiment of the invention, a process for determining codewords that satisfy a selection criterion. In process 640, memory 304 includes 642 a similarity codeword lookup table 305c (see FIG. 3b) for a codebook. The description of the table described in connection with FIG. 6b is incorporated herein by reference, and the table will not be described further. Continuing with process 620, for a downlink frame, control logic 302 performs an exhaustive search 644 over all codewords in the codebook associated with the similarity codeword lookup table. Control logic 302 identifies 644 an initial search codeword that satisfies a selection criterion and that is associated with a certain row in the table. Control logic 302 also sets variable or software construct i to 1 and variable or software construct currentrow to point to the row associated with the intitial search word. As indicated previously in connection with process 620 of FIG. 6b, one or more selection criteria may be available for control logic 302 to use in its search 644. After performing an exhaustive search, for at least one more downlink frame, control logic 302 performs 646 a reduced space search in the row pointed to by currentrow. Control logic 302 performs a search 648 in the first n entries of the row pointed to by currentrow to identify a reduced search codeword that satisfies the same criterion used earlier. Currentrow is made to point to the row associated with the identified reduced search codeword and i is incremented. Software constructs or variables described in this description are stored in memory 304 in an embodiment.

As indicated earlier in connection with FIG. 6b, the number of entries searched, n, is an implementation detail and can vary. In an embodiment, for a 64 codeword codebook, n is 32. In alternative embodiment, control logic 302 uses a different criterion than the one used in the exhaustive search.

After another downlink frame arrives, control logic 302 determines 648 whether i is equal to MaxFrame, where MaxFrame is the number of frames for which a reduced search is performed after an exhaustive search is performed plus 1. If i is equal to MaxFrame, control logic 302 performs 644 another exhaustive search. If i is not equal to MaxFrame, control logic 302 performs 646 a reduced search upon arrival of another downlink frame. One of ordinary skill in the art would appreciate that the rate at which exhaustive searches are done in terms of received downlink frames is an implementation detail which will vary.

A simulation of a receiver implementing the lookup tables and codeword search processes was performed. The simulation confirmed the validity of the assumptions and that performance would be enhanced significantly. The simulation conditions included the following:

$N_t$=4, Nr=2, S=2, L=6, 64 entry codebook CB(4, 2, 6)

Convolutional code with rate ½ used for forward error correction.

Downlink frame consists of 6 OFDM symbols. The channel, though correlated, evolves over the downlink frame. The precoding matrix is selected at the beginning of the frame and is fixed for the duration of the frame.

At the first downlink frame, an exhaustive search is used. For subsequent frames, a reduced search space is used over only the n most similar codewords to the codeword selected for the previous frame where Every 5 downlink frames, a full exhaustive search is performed in order to reduce error propagation.

Lookup tables were made for chordal distance and columnwise correlation similarity metrics and the performance of each table was separately simulated.

The simulation was performed for the following cases: a) chordal distance as the similarity metric and MinChordal as the selection criterion, b) columnwise correlation as the similarity metric and MinChordal as the selection criterion, c) chordal distance as the similarity metric and MaxMMSESNR as the selection criterion, and d) columnwise correlation as the similarity metric and MaxMMSESNR as the selection criterion.

For each case, a random channel with constant characteristics (i.e., no fading or extremely slow fading) was generated and the two best codewords satisfying the selected criterion were identified. For $10^6$ iterations, the distribution of the index i at which the second best codeword would be found given in an optimum codeword was recorded and represented in histograms.

Figure 6D:
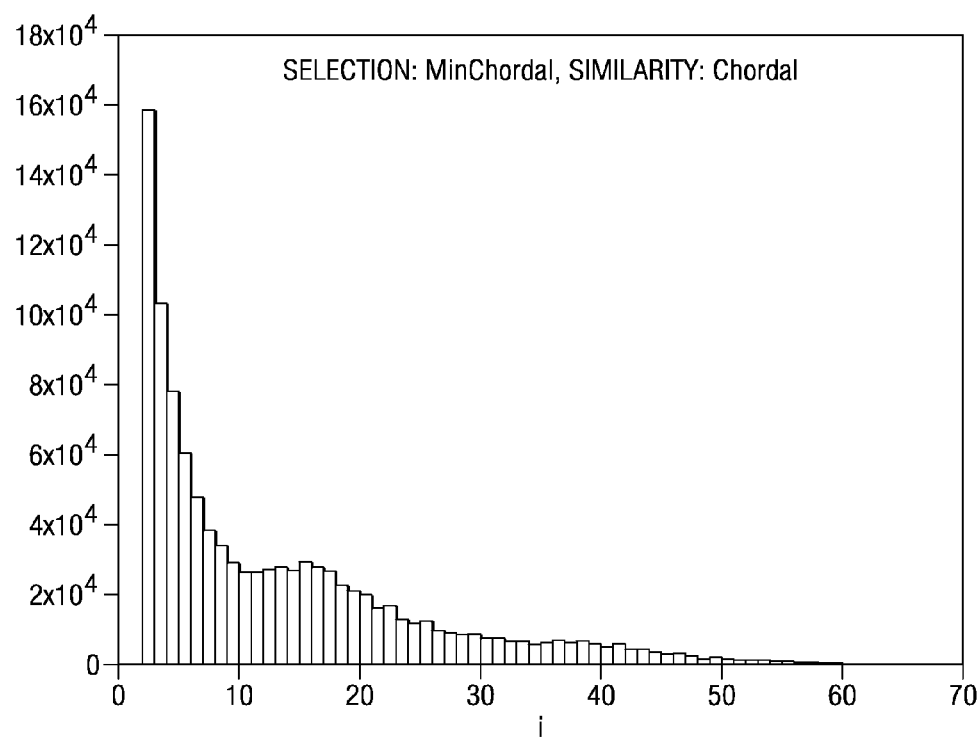
FIG. 6d illustrates a histogram indicative of lookup table performance for a simulation of an embodiment of the invention where chordal distance is the similarity metric and Min-Chordal is the selection criterion.
Figure 6E:
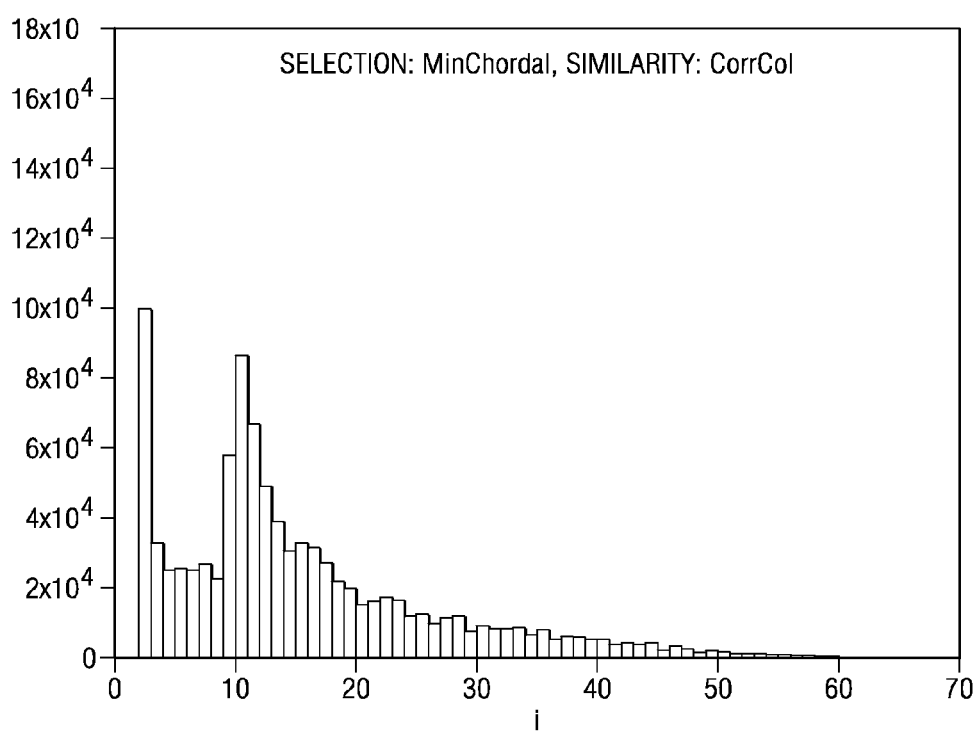
FIG. 6e illustrates a histogram indicative of lookup table performance for a simulation of an embodiment of the invention where columnwise correlation is the similarity metric and MinChordal is the selection criterion.
Figure 6F:
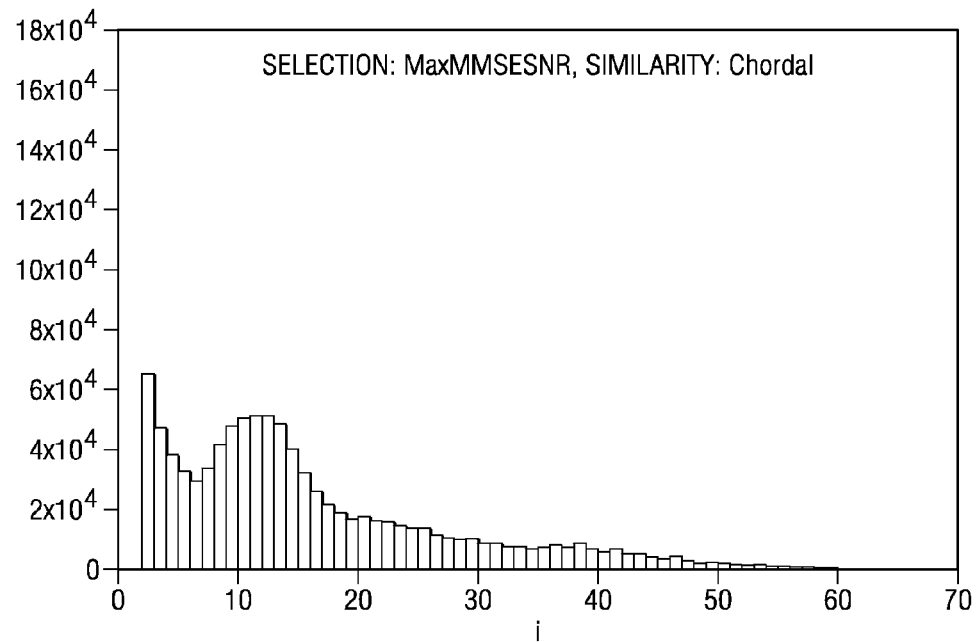
FIG. 6f illustrates a histogram indicative of lookup table performance for a simulation of an embodiment of the invention where chordal distance is the similarity metric and MaxMMSESNR is the selection criterion.
Figure 6G:
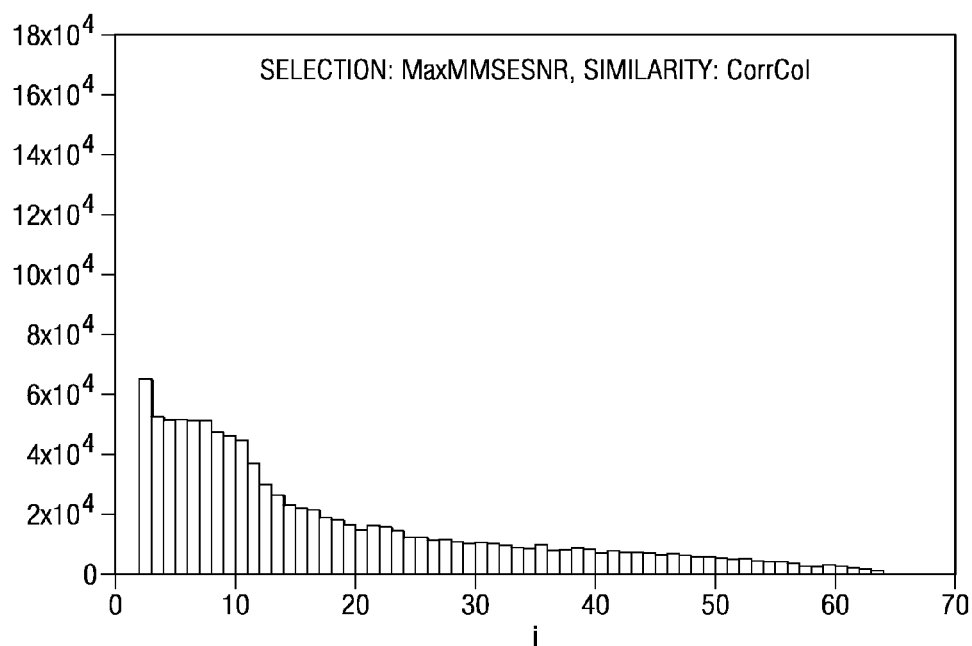
FIG. 6g illustrates a histogram indicative of lookup table performance for a simulation of an embodiment of the invention where columnwise correlation is the similarity metric and MaxMMSESNR is the selection criterion.

FIG. 6d illustrates a histogram indicative of lookup table performance for a simulation of an embodiment of the invention where chordal distance is the similarity metric and MinChordal is the selection criterion. FIG. 6e illustrates a histogram indicative of lookup table performance for a simulation of an embodiment of the invention where columnwise correlation is the similarity metric and MinChordal is the selection criterion. FIG. 6f illustrates a histogram indicative of lookup table performance for a simulation of an embodiment of the invention where chordal distance is the similarity metric and MaxMMSESNR is the selection criterion. FIG. 6g illustrates a histogram indicative of lookup table performance for a simulation of an embodiment of the invention where columnwise correlation is the similarity metric and MaxMMSESNR is the selection criterion.

The histograms, as expected, have the majority of their mass in the low index regions and little to no mass in the tail. This indicates that given the true optimum codeword, the next best codeword can be found in its vicinity. Compared to the other histograms, the histogram in FIG. 6d has more mass in low index values and less mass in the tail. This histogram corresponds to the case when MinChordal is used as the codeword selection criterion and the chordal distance is used as the similarity metric to generate the lookup table.

Table 4a below illustrates for various selection criteria, expressions for evaluating the number of computations required once per selection criterion. Table 4b illustrates expressions for evaluating the number of computations that need to be repeated per codeword in a codebook.

TABLE 4a

| Criterion | Additions | Multiplications | Division | Square Root | Matrix Inversion | SVD |
|---|---|---|---|---|---|---|
| MinChordal | $N_t^2(S-1)$ | $N_t^2 S$ | 0 | 0 | 0 | 1 |
| MaxColCorr | 0 | 0 | 0 | 0 | 0 | 1 |
| MaxRxGain | 0 | 0 | 0 | 0 | 0 | 0 |
| MaxDist | 0 | 0 | 0 | 0 | 0 | 0 |
| MaxMMSESNR | 0 | 0 | 0 | 0 | 0 | 0 |

TABLE 4b

| Criterion | Additions | Multiplications | Division | Square Root | Matrix Inversion | SVD |
|---|---|---|---|---|---|---|
| MinChordal | $N_t^2(S+1) - 1$ | $N_t^2(S+1) + 1$ | 0 | 1 | 0 | 0 |
| MaxColCorr | $S^2(N_t - 1) + (S-1)S!$ | $S^2(N_t + 2)$ | 0 | $S!$ | 0 | 0 |
| MaxDist | $S^2 N_t - S + (S+2)\frac{S!}{2(S-2)!}$ | $S^2(N_t + 1) + S\frac{S!}{2(S-2)!}$ | $\frac{S!}{2(S-2)!}$ | 0 | 0 | 0 |
| MaxRxGain | $S^2 N_t - S$ | $S^2(N_t + 1)$ | 0 | 0 | 0 | 0 |
| MaxMMSESNR | $S(S^3 + S^2(2N_t - 3) + S + 1)$ | $S(S^3 + 2S^2 N_t)$ | $S$ | 0 | 1 | 0 |

Table 5 below, for several selection criteria, illustrates the total number of operations required per subcarrier to determine the optimum preceding matrix in a 64 entry codebook in the case of four transmitter antennas and two data streams, which is a practical case to consider for mobile applications. The low complexity entry in Table 5 refers to the criteria, such as correlation with $V_s$ or $V_w$, used in processes 400 and 500.

TABLE 5

| Criterion | Additions | Multiplications | Division | Square Root | Matrix Inversion | SVD |
|---|---|---|---|---|---|---|
| MinChordal | 3024 | 3168 | 0 | 64 | 0 | 1 |
| MaxColCorr | 896 | 1536 | 0 | 128 | 0 | 1 |
| MaxRxGain | 896 | 1280 | 0 | 0 | 0 | 0 |
| MaxDist | 1152 | 1408 | 64 | 0 | 0 | 0 |
| MaxMMSESNR | 3968 | 5120 | 128 | 0 | 64 | 0 |
| Low Complexity | 60 | 89 | 16 | 0 | 0 | 1 |

Table 6 below shows the probability of selecting the next best codeword given the true optimum codeword, where the search for the next best codeword is limited to a search within the n most similar codewords.

TABLE 6

| Selection | Similarity | n = 5 | n = 10 | n = 20 | n = 32 |
|---|---|---|---|---|---|
| MinChordal | Chordal | 0.4011 | 0.5739 | 0.8222 | 0.9357 |
|  | CorrCol | 0.1872 | 0.4117 | 0.7542 | 0.9015 |
| MaxMMSESNR | Chordal | 0.1818 | 0.3847 | 0.7041 | 0.8464 |
|  | CorrCol | 0.2219 | 0.4626 | 0.6891 | 0.8296 |

As indicated by Table 5, compared to other combinations of selection criterion and similarity metric, when MinChordal is used as a codeword selection criterion and the chordal distance is chosen as the matrix similarity measure, there is a higher probability that given the optimum codeword, the next best codeword is in its vicinity.

Figure 7A:
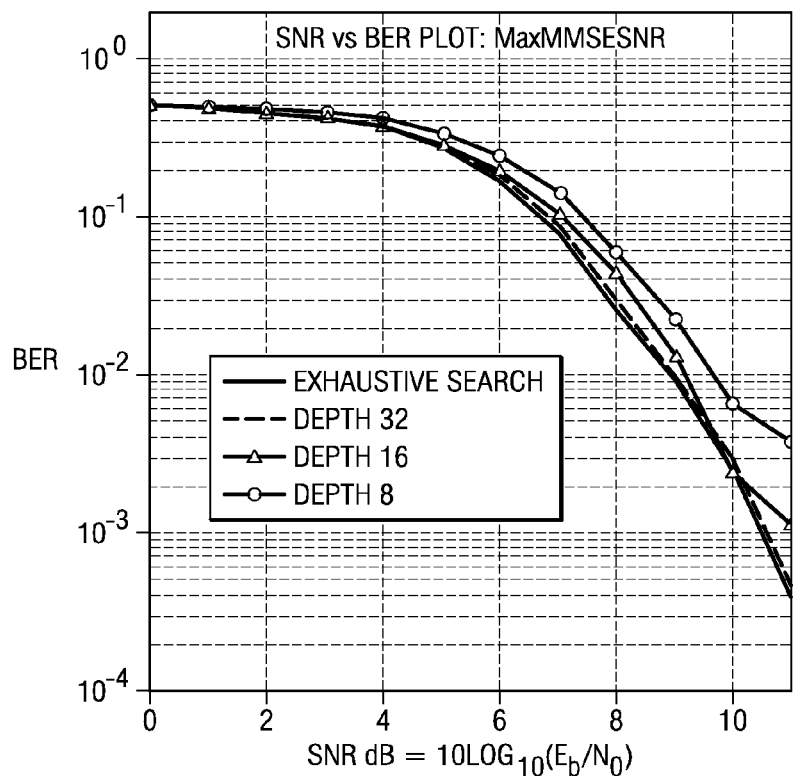
FIG. 7a illustrates a plot indicative of the bit error rate vs. SNR performance for a simulation of an embodiment of the invention where chordal distance is the similarity metric, MaxMMSESNR is the selection criterion for various values of search depth n.
Figure 7B:
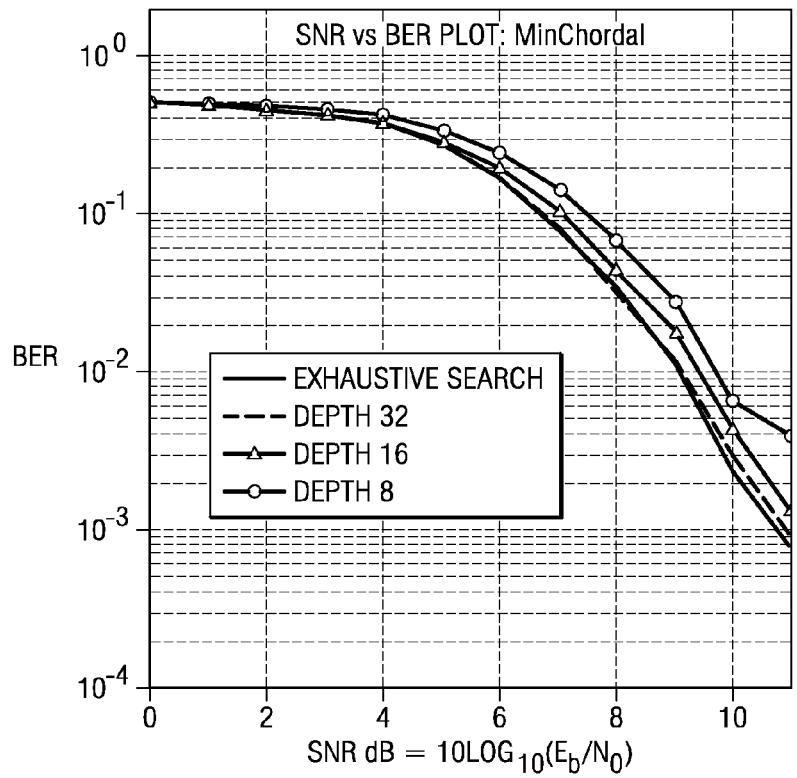
FIG. 7b illustrates a plot indicative of the bit error rate vs. SNR performance for a simulation of an embodiment of the invention where chordal distance is the similarity metric, MinChordal is the selection criterion for various values of search depth n.

The effect of the selection criterion (MaxMMSESNR or MinChordal), similarity metric and depth of search (i.e., n) on bit error rate (BER) performance was also examined. FIG. 7a illustrates a plot indicative of the bit error rate vs. SNR performance for a simulation of an embodiment of the invention where chordal distance is the similarity metric, MaxMMSESNR is the selection criterion for various values of search depth n. FIG. 7b illustrates a plot indicative of the bit error rate vs. SNR performance for a simulation of an embodiment of the invention where chordal distance is the similarity metric, MinChordal is the selection criterion for various values of search depth n.

From FIGS. 7a and 7b it is apparent from both plots that there would be a negligible loss when the search is performed over only the 32 codewords (depth 32) most similar to the codeword identified in an exhaustive search. With a search depth of 16 codewords, there would be about a 1 dB loss in performance. When the search depth drops to 8, over 1.5 dB loss in performance would be expected.

In the preceding specification, the invention has been described with reference to specific exemplary embodiments of the invention. It will, however, be evident to one of ordinary skill in the art that various modifications and changes may be made without departing from the broader spirit and scope of the invention as set forth in the claims that follow. The specification and drawings are accordingly to be regarded in an illustrative rather than restrictive sense. Embodiments can be expressed as—and are not limited to—components, pro-

What is claimed is:

1. A method of determining indices for matrix codewords in a matrix codeword codebook, the matrix codewords adapted for communicating information between a transmitter and a receiver, the method comprising:
retrieving from temporary storage an eigenmode representation for a communications channel, wherein the representation of the eigenmode is based upon on a received signal precoded by a first matrix codeword;
performing a test on multiple vector codewords to identify a first vector codeword among the multiple vector codewords, wherein the test includes determining a relationship between the first vector codeword and the eigenmode representation, the first vector codeword is associated with a first vector codeword index that identifies the first vector codeword; and
generating a matrix codeword index associated with a second matrix codeword in the matrix codeword codebook, wherein the matrix codeword index is based upon the first vector codeword index, and the order of the first vector codeword is different from the order of the second matrix codeword.

2. The method of claim 1, further comprising receiving the signal precoded by the first matrix codeword.

3. The method of claim 1, further comprising:
sending a representation of the matrix codeword index to the transmitter; and
receiving a second signal precoded by the second matrix codeword.

4. The method of claim 1, wherein the eigenmode representation for the communications channel includes a weakest eigenmode, and determining a relationship between the first vector codeword and the eigenmode representation includes determining correlation between the weakest eigenmode and the first vector codeword.

5. The method of claim 4, wherein the correlation between the weakest eigenmode and the first vector codeword is stronger than correlations between the weakest eigenmode and each of the vector codewords, other than the first vector codeword, among the multiple vector codewords.

6. The method of claim 1, wherein the eigenmode representation for the communications channel includes a strongest eigenmode, and determining a relationship between the first vector codeword and the eigenmode representation includes determining a correlation between the strongest eigenmode and the first vector codeword.

7. The method of claim 6, wherein the correlation between the strongest eigenmode and the first vector codeword is greater than correlations between the strongest eigenmode and each of the vector codewords, other than the first vector codeword, among the multiple vector codewords.

8. The method of claim 1, further comprising:
generating a vector by taking the product of a Householder operation on a vector codeword and the eigenmode representation; and
performing a second test on a second multiple vector codewords to identify a second vector codeword among the second multiple vector codewords, wherein the second test includes determining a relationship between the second vector codeword and the generated vector, and the second vector codeword is associated with a second vector codeword index that identifies the second vector codeword.

9. The method of claim 8, wherein the matrix codeword index is also based upon the second vector codeword index.

10. The method of claim 1, further comprising:
generating a matrix by taking the product of a Householder operation on a vector codeword and the eigenmode representation; and
performing a second test on a second multiple vector codewords to identify a second vector codeword among the second multiple vector codewords, wherein the second test includes determining a relationship between the second vector codeword and a column of the generated matrix, and the second vector codeword is associated with a second vector codeword index that identifies the second vector codeword.

11. The method of claim 10, wherein the matrix codeword index is also based upon the second vector codeword index.

12. An apparatus that determines indices for matrix codewords in a matrix codeword codebook, the matrix codewords adapted for communicating information between a transmitter and a receiver, the apparatus comprising:
an electronically accessible storage that is to store an eigenmode representation for a communications channel, wherein the representation of the eigenmode is based upon a received signal precoded by a first matrix codeword;
control logic coupled to the temporary storage and that is to perform a test on multiple vector codewords to identify a first vector codeword among the multiple vector codewords, wherein the test includes determining a relationship between the first vector codeword and the eigenmode representation, the first vector codeword is associated with a first vector codeword index that identifies the first vector codeword; and
wherein the control logic generates a matrix codeword index associated with a second matrix codeword in the matrix codeword codebook, wherein the matrix codeword index is based upon the first vector codeword index, and the order of the first vector codeword is different from the order of the second matrix codeword.

13. The apparatus of claim 12, further comprising a receiver coupled to the control logic and that is to receive the signal precoded by the first matrix codeword.

14. The apparatus of claim 13, further comprising a second transmitter coupled to the control logic and that is to send a representation of the matrix codeword index to the first transmitter, and wherein the receiver is to receive a second signal precoded by the second matrix codeword.

15. The apparatus of claim 13, wherein the eigenmode representation for the communications channel includes a weakest eigenmode, and the control logic is to determine a relationship between the first vector codeword and the eigenmode representation by determining correlation between the weakest eigenmode and the first vector codeword.

16. The apparatus of claim 13, wherein the eigenmode representation for the communications channel includes a strongest eigenmode, and the control logic is to determine a relationship between the first vector codeword and the eigenmode representation by determining a correlation between the strongest eigenmode and the first vector codeword.

17. The apparatus of claim 13, wherein the control logic is to generate a vector by taking the product of a Householder operation on a vector codeword and the eigenmode representation, and is to perform a second test on a second multiple vector codewords to identify a second vector codeword among the second multiple vector codewords, and wherein the second test includes determining a relationship between the second vector codeword and the generated vector, the second vector codeword is associated with a second vector codeword index that identifies the second vector codeword, and the matrix codeword index is also based upon the second vector codeword index.

18. The apparatus of claim 13, wherein the control logic is to generate a matrix by taking the product of a Householder operation on a vector codeword and the eigenmode representation, and perform a second test on a second multiple vector codewords to identify a second vector codeword among the second multiple vector codewords, and wherein the second test includes determining a relationship between the second vector codeword and a column of the generated matrix, the second vector codeword is associated with a second vector codeword index that identifies the second vector codeword, and the matrix codeword index is also based upon the second vector codeword index.

19. A method of determining indices for matrix codewords in a matrix codeword codebook, the matrix codewords adapted for communicating information between a transmitter and a receiver, the method comprising:
  determining number of transmit antennas, $N_t$, being used to transmit to the receiver and the number of data streams, $N_s$, being transmitted to the receiver;
  identifying a Householder operation and a vector codebook for generating a matrix codeword codebook, $CB(N_t, N_s, L)$, wherein L is a representation of a number of bits in an index for identifying each matrix codeword in the matrix codeword codebook;
  based upon the identified Householder operation and the vector codebook, performing a first test on multiple vector codewords associated with the vector codebook, wherein the result of the first test is a first vector code index that identifies a first vector codeword among the multiple vector codewords; and
  based upon the result of the first test generating a matrix codeword index associated with a second matrix codeword in the matrix codeword codebook, wherein the order of the first vector codeword is different from the order of the second matrix codeword.

20. The method of claim 19, further comprising:
generating a matrix by taking the product of a Householder operation on a vector codeword and the eigenmode representation; and
performing a second test on a second multiple vector codewords to identify a second vector codeword among the second multiple vector codewords, wherein the second test includes determining a relationship between the second vector codeword and the generated matrix, the second vector codeword is associated with a second vector codeword index that identifies the second vector codeword, the matrix codeword index is also based upon the second vector codeword index, and the generated matrix has an order that is either equivalent to or greater than the order of the second vector codeword.

* * * * *